(12) United States Patent
Gauthier et al.

(10) Patent No.: US 10,586,241 B2
(45) Date of Patent: Mar. 10, 2020

(54) RENDERING DETAILS FROM USER SELECTIONS OF MINED DATA HABITS

(71) Applicant: SAP SE, Walldorf (DE)

(72) Inventors: Alain Gauthier, Montreal (CA); Mohannad El-Jayousi, L'Ile-Bizard (CA); Farid Toubal-Seghir, Laval (CA); Roy Ghorayeb, Montreal (CA); Ghufran Iftikhar, Vaudreuil-Dorion (CA); James Zdralek, Montreal (CA); Rischa Poncik, Dorval (CA); Wanling Zhang, Montreal (CA)

(73) Assignee: SAP SE, Walldorf (DE)

(*) Notice: Subject to any disclaimer, the term of this patent is extended or adjusted under 35 U.S.C. 154(b) by 790 days.

(21) Appl. No.: 14/821,465

(22) Filed: Aug. 7, 2015

(65) Prior Publication Data

US 2017/0039576 A1 Feb. 9, 2017

(51) Int. Cl.
*G06Q 30/02* (2012.01)

(52) U.S. Cl.
CPC ..... *G06Q 30/0201* (2013.01); *G06Q 30/0204* (2013.01)

(58) Field of Classification Search
CPC combination set(s) only.
See application file for complete search history.

(56) References Cited

U.S. PATENT DOCUMENTS

| 8,650,492 B1* | 2/2014 | Mui ............. H04L 43/045 715/736 |
| 9,021,361 B1* | 4/2015 | Pettinati ............. G06F 3/048 715/736 |
| 9,584,853 B2* | 2/2017 | Frebourg ............. G06F 16/24 |
| 2015/0081701 A1* | 3/2015 | Lerios ............. H04L 43/045 707/736 |
| 2016/0063072 A1* | 3/2016 | N ............. G06F 16/248 707/722 |
| 2017/0098318 A1* | 4/2017 | Iannaccone ............. G06F 3/0485 |

* cited by examiner

*Primary Examiner* — Matthew S Gart
*Assistant Examiner* — Scott M Ross
(74) *Attorney, Agent, or Firm* — Jones Day

(57) ABSTRACT

Methods and systems of the present disclosure provide techniques for selecting displayed data in a Customer Journey diagram as eligible for one of presentation of contextual data and analysis. The methods may further include analysis or presentation of the selected displayed data in a manner that maximizes the comprehensibility of the data. The techniques for selecting displayed data as eligible for presentation or analysis include at least one of: increasing the visibility of a selected path; selecting, or multi-selecting, paths and/or Nodes for analysis; rendering contextual data from a Customer Journey diagram according to a point of click; providing additional methods for presentation of contextual data or action options; providing granular drilling information regarding a Customer Journey on demand; and dynamically adjusting a point of focus according to a diagram selection.

19 Claims, 30 Drawing Sheets

100

200

300

| | Context | Point of Click 708 | Click 710 | Content 712 | Query 714 716 |
|---|---|---|---|---|---|
| 702 | Marketing | NODE Campaign | 1 Click | Stat-SentimentScore | _SYS_BIC"."cji.sentiment CA_CJI_PATH_PROTO3 718 |
| 704 | Marketing | NODE Campaign | 1 Click | Stat-Age | _SYS_BIC"."cji.age CA_CJI_PATH_PROTO3 720 |
| 706 | Marketing | PATH Campaign-Social | 2 Click | Number of customer and Revenue generated | _SYS_BIC"."cji.customer CA_CJI_PATH_PROTO3 722 |
| ... | | | | | |

FIG. 7

| | Business Context 1024 | User Action 1026 | Type of Chart 1028 | Data 1030 | Position 1032 |
|---|---|---|---|---|---|
| 1002 | Marketing | Load Sankey | Line | Sentiment Score | Top |
| 1004 | Marketing | Load Sankey | Horizontal Bar | User Age | Top |
| 1006 | Marketing | Load Sankey | Cloud | Interest | Top |
| 1008 | Marketing | Load Sankey | Pie Chart | Gender | Top |
| 1010 | Marketing | Load Sankey | Delocalization | Map | Top |
| 1012 | Marketing | Click node/path | Line | Sentiment Score | Dialog |
| 1014 | Marketing | Click node/path | Horizontal Bar | User Age | Dialog |
| 1016 | Marketing | Click node/path | Cloud | Interest | Dialog |
| 1018 | Marketing | Click node/path | Pie Chart | Gender | Dialog |
| 1020 | Marketing | Click node/path | Delocalization | Map | Dialog |
| 1022 | ... | | | | |

FIG. 10

| Node ID 1218 | Parent Node ID 1220 | Color 1222 |
|---|---|---|
| Email | X | Green |
| Internet | X | Blue |
| Store | X | Purple |
| Phone | X | Red |
| Buy | X | Orange |
| Hotmail | Email | X |
| Gmail | Email | X |
| Outlook Mail | Email | X |

| 1200 | Node ID 1218 | Parent Node ID 1220 | Color 1222 |
|---|---|---|---|
| 1202 | Email | X | Green |
| 1204 | Internet | X | Blue |
| 1206 | Store | X | Purple |
| 1208 | Phone | X | Red |
| 1210 | Buy | X | Orange |
| 1212 | Hotmail | Email | X |
| 1214 | Gmail | Email | X |
| 1216 | Outlook Mail | Email | X |
| 1242 | Best Buy | Store | X |
| 1244 | Circuit City | Store | X |

FIG. 12D

RENDERING DETAILS FROM USER SELECTIONS OF MINED DATA HABITS

CROSS-REFERENCE TO RELATED APPLICATIONS

This application is related to other concurrently-filed and commonly assigned applications, including:
- U.S. patent application Ser. No. 14/821,476, entitled "Generating Metadata and Visuals Related to Mined Data Habits";
- U.S. patent application Ser. No. 14/821,332, entitled "Sankey Diagram Graphical User Interface Customization";
- U.S. patent application Ser. No. 14/821,437, entitled "Building Business Objects Based on Sankey Diagram"; and
- U.S. patent application Ser. No. 14/821,446, entitled "Simplification of Sankey Diagram".

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

FIELD

Methods, devices, and systems that relate to generation of a User Interface providing relevant data in a Sankey diagram regarding a journey over time according to mined data regarding the habits of the end user undertaking the journey; and in addition, to analysis of the relevant data presented in the Sankey diagram over the User Interface in a manner that supplements the experience of the user.

BACKGROUND

Most companies in both the service and goods industries foster relationships with the end users of their products and/or services. Such relationships may begin early on in the process, such as during a marketing campaign, and the relationships may continue for quite some time. Occasionally relationships with customers result in a customer purchase of a good and/or service. To provide quality customer relations, companies often track data related to the growth of customer relationships. For example, some companies track whether or not correspondence has been sent to a customer (e.g., a catalog and/or an email). Separately, some companies also track customer purchases over time and the customer's satisfaction with a good and/or service. For example, after a sale is completed some of these companies track customer satisfaction according to a customer's responses in a survey.

However, companies do not track, throughout the relationship between the customer and the company, the totality of the interactions. These companies, instead, segment their customer relations into separate marketing and customer satisfaction arenas. Accordingly, the companies fail to identify trends regarding the customer interactions and sales. Similarly, the companies fail to identify the relative success rates of trends from the interactions among specific demographics of customers.

Known visualization tools, implemented by these companies for reviewing the success of an interaction with a customer are cumbersome and difficult to readily interpret. Tables, containing large numbers entries regarding customer data (e.g., a customer's date of birth and their sales history), remain untransformed tables. Identifying and tracking trends among tables of categorized data or graphs of categorized data requires significant individual analysis and time.

Taking the time to interpret and analyze the categorized data stymies sales and the ability of the companies to recognize successful and unsuccessful trends in their respective customer relationships. Furthermore, the data presented in known visualization tools fails to acknowledge time relationships or hierarchical relationships that clearly exist in the interaction data. For example, the data presented does not acknowledge an interaction that is in time immediately before or immediately after the data under analysis in a table or graph.

Lag time between interactions, sales, and any analysis of the interactions further is detrimental to the companies. Information regarding the interactions is reviewed or considered relevant only after a sale is completed. Such information is culled, categorized, and only then transformed into a categorized graph and/or table for the review of the analytics team of the company. The slow analysis process of these companies further hinders their ability to quickly respond to trends in the customer interactions that could otherwise save the company money or generate additional revenue for the company.

Furthermore, the known visualization tools are simply tools that provide the data as is. After analysis of the data, the company or an employee might suggest that a portion of the represented data should be further analyzed according to a specific criteria using a different tool. However, the time spent in recognition of a trend, in generation of interest in a possible data correlation, and in translation to a different tool for the analysis is again time lost that could instead be used to respond to identified trends in the marketplace.

Accordingly, a there is a need for a method, a system, and a visualization tool that is capable of selecting data for presentation in the visualization tool according to mined data regarding a customer's journey, including the customer's habits and characteristics, and dynamically presenting the selected data in an intuitive manner that further allows for analysis and additional contextual data inquiries.

BRIEF DESCRIPTION OF THE DRAWINGS

FIG. 7 is an illustration of a Dynamic Build Table 700 generated to support rendering contextual data or analysis related to a Customer Journey diagram.

FIG. 10 illustrates a Customization Table 1000 for the Customer Journey diagram that provides possible configurations of the displays to be rendered on the User Interface.

FIG. 12A is an illustration of a Drill Customizing Table 1200 that is configured to supply upon a user demand the hierarchical relationship between Nodes in a Customer Journey diagram.

FIG. 12D is an illustration of a Drill Customizing Table 1200 that is configured to supply upon a user demand the hierarchical relationship between Nodes in a Customer Journey diagram.

DETAILED DESCRIPTION

Figure 1:
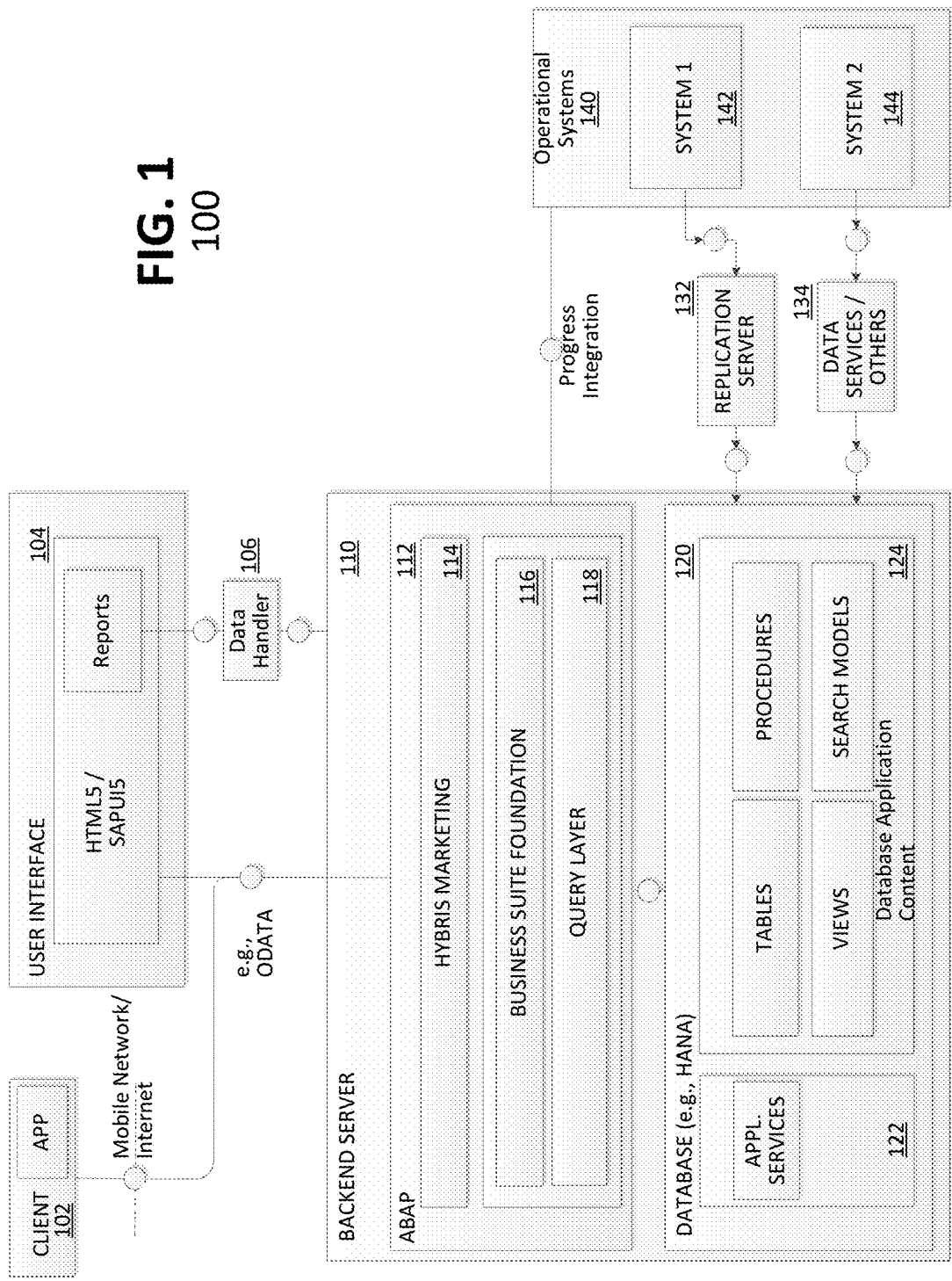
FIG. 1 is an illustration of an architectural overview of a networked system 100 that provides access to a database for embodiments of the present invention.

Example embodiments of the present invention provide for methods, devices, and systems for providing, for display in a user interface, relevant data regarding an end user journey through milestones according to mined data regarding the end user's habits; and, in addition, for analyzing the provided data over the user interface.

Although the present invention is often described with reference to marketing as the business context, it is to be understood that applications of the current invention extend beyond the marketing industry and into other industries in which an end user has numerous interactions or milestones that can be tracked, stored, and analyzed by the system. The tracking and storage of the end user interactions and/or milestones are processed by the system to provide a high-level visual interpretation of a plurality of end user interactions. Information that would otherwise be presented in a table, and complex to analyze, is instead presented in a manner that allows for intuitive understanding of the trajectory of the end user interactions as well as the density of the end user interactions.

In order to provide clarity, the end users whose interactions and/or milestones are tracked are herein referred to as "customers" and the persons accessing the information regarding the customer experience are herein referred to as "users." Also to provide clarity, the interactions and/or milestones experienced by the customers are herein referred to as "Nodes." The Nodes describe the landmark experiences of the customers, and dense lines leading to or from a Node, and the sequence of Nodes may be significant to the user as is further described herein. The trajectory or the flow of the customer experience over time is herein referred to as a "path." The paths assist with the analysis of the customer experience over time, and amalgamations of paths are accordingly represented as larger, or dense, paths. Paths are, generally, provided as a linear function of time. Therefore, a path that, from left to right intersects with a first Node and then a second Node, refers to a customer interaction with the first Node at an earlier point in time than the time that the customer interacts with the second Node. A portion of a path that is uninterrupted between two Nodes is referred to as a "link." In some embodiments, the paths are combined in the form of a Sankey diagram, although other similar diagrams are considered incorporated herein.

The above described Nodes, paths, and links are generally depicted on a User Interface. The User Interface depicts a Customer Journey diagram, which in turn provides the relative relationship between the Nodes, paths, and links. In some embodiments, the Customer Journey diagram is in the form of, or includes, a Sankey diagram. Moreover, the User Interface provides the user with passive and interactive options in order to review the presented data. The user can interact with the User Interface by: modifying the filter criteria for the data presented in the Customer Journey diagram, analyzing via an action the data presented in the Customer Journey diagram, and performing additional functionality as is described in greater detail according to the following description. The user can passively view additional contextual data related to the data presented in the Customer Journey diagram and observe additional functionality from the data presented in the Customer Journey diagram as is described in greater detail according to the following description.

The User Interface interacts with a backend server, and overall the User Interface, the backend server, and any necessary intermediary or supplemental servers form a system for analyzing and presenting the stored customer habits. According to an example embodiment, the data available on the backend server is updated in real time and similarly, the User Interface is configured to be updated in real time. In some embodiments, regardless of the update timing associated with the backend server, the User Interface is capable of responding to and firing queries in real time such that the data maintained on the display of the User Interface is as complete as possible. The responses to the queries are returned to the device associated with the User Interface, and the responses are interpreted and rendered into the above described visual form in the Customer Journey diagrams.

The Customer Journey diagram, presented on the User Interface, is not merely a graphical representation. The system further, including the backend server, generates "metadata" that shows the relations between the customer interaction records based on time. Metadata related to the sequence of customer interactions is not exactly stored as such in the database. Instead, the database stores the core data and Customer Journey diagram build instructions that transform the mined data habits, including the customer interactions, into a visualization of the records. The transformation of the data involves at least computation of the involved paths and aggregation of the collective paths into the Customer Journey diagram. The path aggregation and presentation allows for decision making based on a critical mass of information.

FIG. 1 is a system diagram depicting an architectural overview of a networked system 100 suitable for use with embodiments of the present invention. As shown in FIG. 1, the networked system 100 includes client device 102, user interface server 104, and backend server 110.

The networked system 100 includes one or more client devices 102, being network accessible via an Internet connection, and connected to a backend server 110. Client device 102 may include a variety of devices such as, for example, a mobile device (e.g., mobile phone or smartphone), a personal computer, a laptop, a tablet, and the like. In addition, client device 102 may host one or more client applications, such as a client journey application.

A client journey application may mine large amounts of user interaction data stored within data sources 120 of backend server 110. The client journey application may utilize such user interaction data to provide and graphically render trends in user interactions for a respective business product according to the methods described herein. For example, when many users buy a product, the client journey application may graphically render various channels (also referred to as paths or links) that customers traverse to purchase the given product. The various purchasing channels and their respective frequencies (e.g., a frequency of use) may be mined from data sources 120, and graphically rendered by a client device 102 of networked system 100.

Client device 102 and user interface server 104 may be configured to exchange data with an enterprise data system, such as a backend server 110. In some embodiments, data is exchanged via data handler 106. User interface server 104 may utilize a variety of interfaced technologies. Some example interface technologies include HTML5, SAP® UI5, SAP®-WebDynpro, SAP® Gui, Perl, and the like. In addition, the user interface technology may operate in conjunction with business object platforms for visualizing business objects, such as SAP® Business Object Platform (SBOP), SAP® Business Intelligence Platform (SBIP), and the like.

User interface server 104 may generate interface code at runtime. However, depending on the interface technology, some embodiments may implement functions of the user interface server 104 on the client-side. For example, functions of the user interface server 104 may be implemented at the client device 102 on a browser using HTML5, javascript, CSS, or on a device using ObjectiveC. Thus, in some implementations, implementation of user interface server 104 may be optional.

The backend server 110 may be configured to process request(s), retrieve data, and/or perform data operations as an appropriate response to a request, and return a response for transmission back to the client device 102 or user interface server 104. In the example configuration depicted in FIG. 1, the backend server 110 may include one or more advanced business application programming (ABAP) modules 112, such as marketing module 114, which may be a Hybris® marketing module. For example, hybris marketing module 114 may be configured to track and store user interactions, such as user shopping history, product browsing history, purchase history, and associated product information. In some instances, hybris marketing module 114 may be further configured to track and store a particular user's interactions across multiple devices of the user. ABAP modules 112 may further include additional modules, such as business suite foundation module 116 and query layer 118 that may be configured to facilitate the exchange of data between the hybris marketing module 114 and database 120.

The backend server 110 may further include one or more data sources 120. In the example depicted in FIG. 100, data source 120 may include application support modules 122 and database content 124 that may include a variety of tables, views, search models, search procedures, and the like. In addition to internal data sources 120, backend server 110 may further be coupled to a variety of external data sources 140. For example, external systems 142 and 144 may be coupled to the backend server 110 via replication server 132 and/or other data services 134, respectively. In some embodiments, backend server is connected to external data sources via progress integration. By forming the connection via progress integration, data sources can be updated or overhauled without stalling or hindering data analysis and path aggregation.

Some example external data sources may include transactional information such as contact information, sales activities, quotations, and sales orders from CRM (customer relationship management) and ERP (enterprise resource planning) systems. In some instances, the backend server 110 may aggregate data from multiple backend servers. Within backend server 110, a variety of data, may be quickly aggregated without compromising backend or overall system performance. In some instances, various data may be represented using virtual data models (VDMs) to enable faster data aggregation. Here, a plurality of VDMs may be aggregated into fewer, or even a single VDM. Thus, aggregated data may be presented along one or more displays of a client journey application.

In addition, the backend server 110 may be implemented by or coupled to an in-memory database. In-memory databases are located within the main memory of a computer system or a coupled device, which provides the advantage of faster data access and faster program execution. In-memory databases also enable real-time operation on a computer or device, or on multiple computers or devices communicating through wired or network connections. An example of an in-memory database is the SAP® high-performance analytic appliance (HANA®). However, the embodiments are not limited to any particular in-memory database technology.

The various components networked system 100, such as client device 102, user interface server 104, and backend server 110, may be connected using known and expected network technologies, such as an Internet connection. In another example, a data handler 106 may be configured to exchange data between user interface server 104 and backend server 110. Here, the data handler 106 may include SBOP (SAP Business Objects Platform) and SBIP functions.

Figure 2:
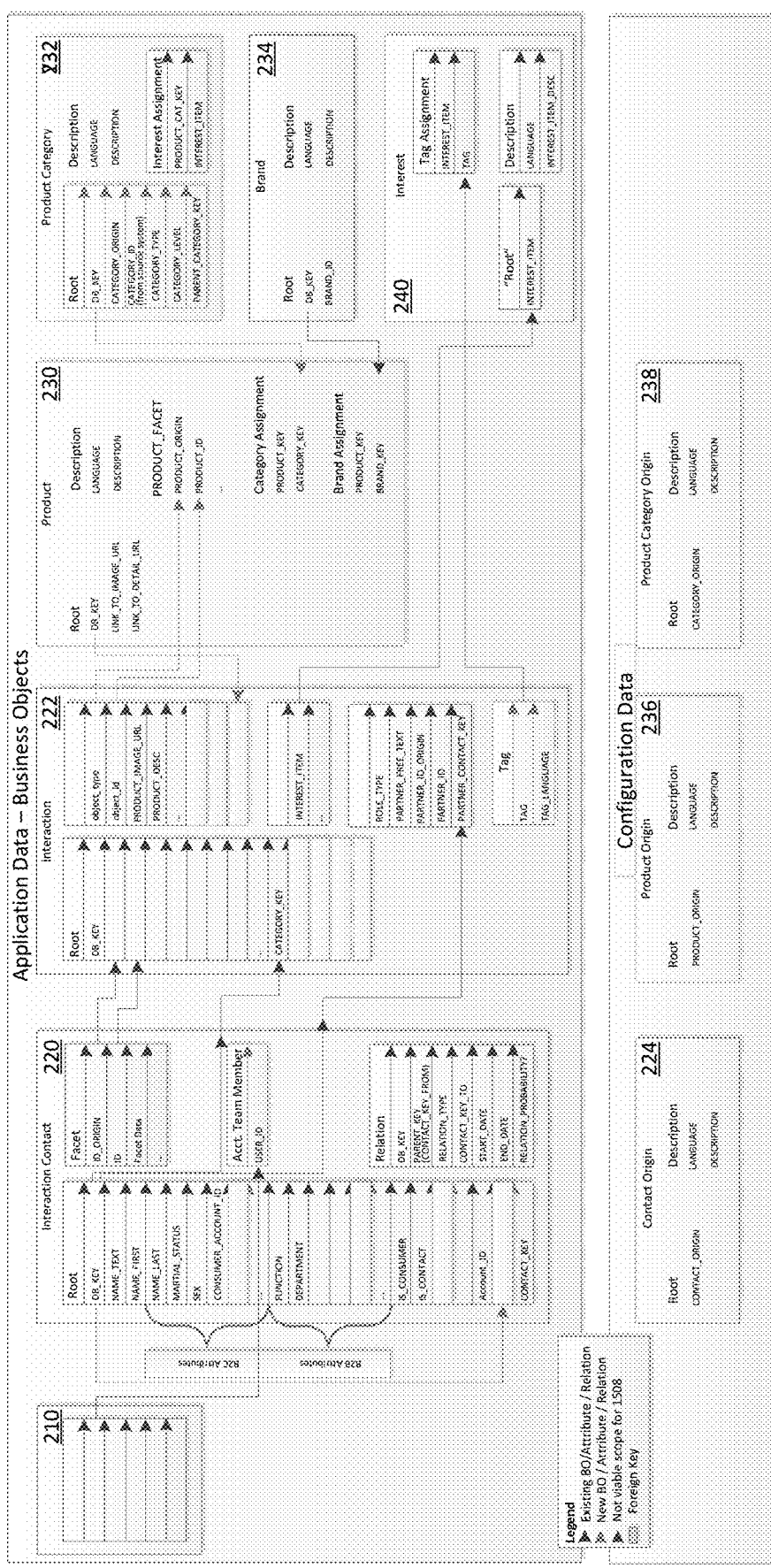
FIG. 2 is an illustration of an architectural overview of a database 200 according to an example embodiment of the present invention.

FIG. 2 is a block diagram depicting an architectural overview of a database 200 according to an example embodiment of the present invention. As shown in FIG. 2, the database includes a plurality of application and configuration data tables that may be used to track and store user interactions (e.g., user shopping history, product browsing history, purchase history, and associated product information). Example application data tables include user table 210, interaction contact table 220, interaction table 222, product table 230, product category table 232, brand table 234, and interests table 240. In addition, example configuration tables include contact origin table 224, product origin table 236, and product category origin table 238.

Figure 3:
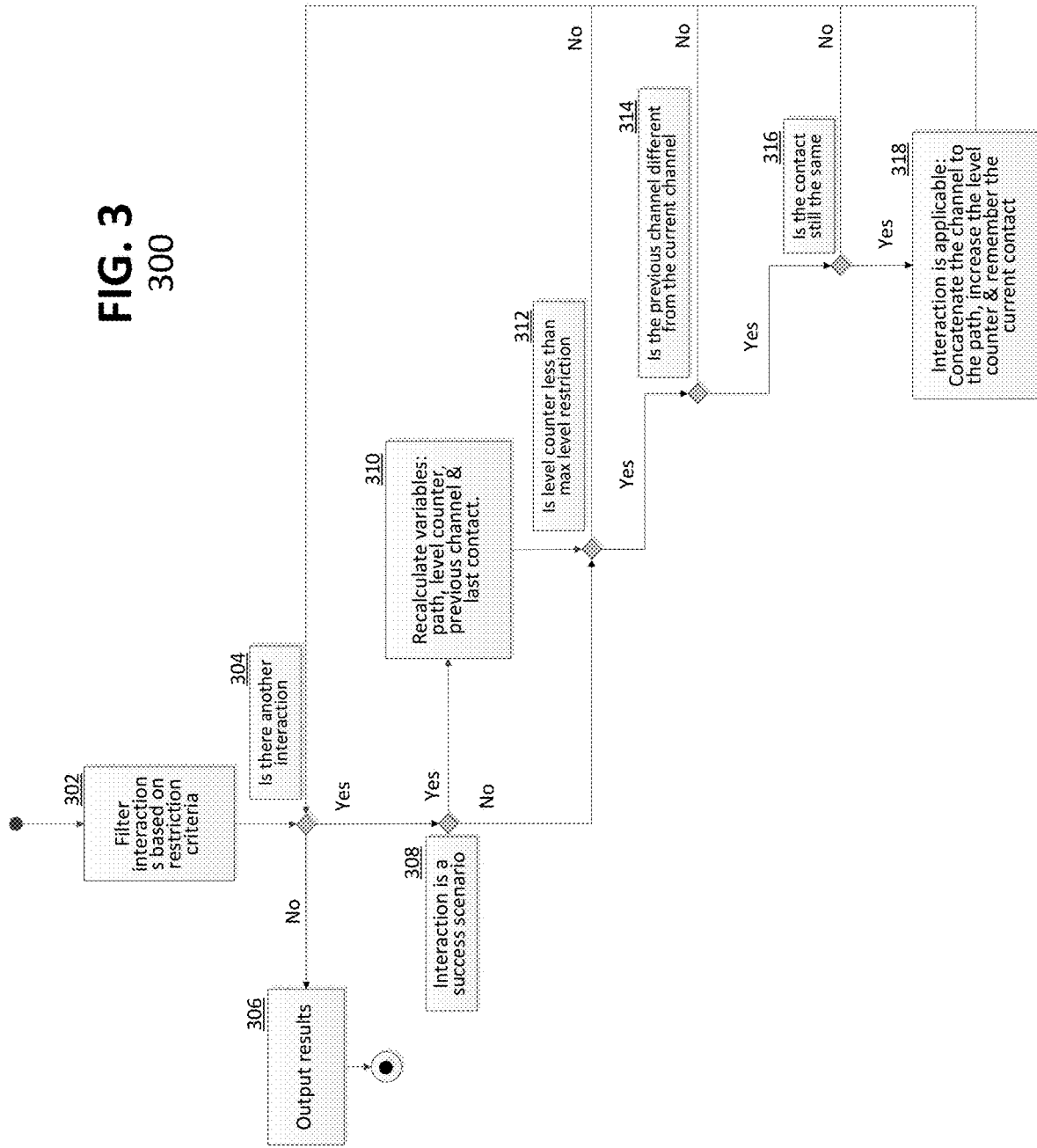
FIG. 3 is an illustration of a method 300 for mining a database according to an example embodiment of the present invention.

FIG. 3 illustrates a method 300 for mining a database according to an example embodiment of the present invention. At the outset, a user of the client device may filter interactions based on restriction criteria, at 302. For example, restriction criteria may include a particular product, product category, group of products, particular brand, and/or the like.

Next, at 304, the method 300 determines whether another respective interaction has occurred. Here, the method 300 may periodically determine whether other respective interactions have occurred. Alternatively, step 304 may be triggered by a change to one of the data sources. If no other respective interactions have occurred, the method 300 may proceed to output search results, at 306. As discussed above, the search results may be supplied to a requesting user interface server and/or client device. If another respective interaction has occurred, the method 300 may proceed to 308.

At 308, the method 300 determines whether the respective interaction is a success scenario (e.g., purchase of a product). If the respective interaction is a success scenario, one or more variables (e.g., path, level counter, previous channel, last contact, and/or the like) used for graphically rendering the user interaction data may be recalculated at 310.

In an embodiment, after the recalculation, the method 300 may proceed to steps 312-316. In an embodiment, if the interaction is not a success scenario, the method 300 may proceed to steps 312-316.

At step 312, the level counter variable may be compared to a maximum level restriction. For example, the comparison of the level counter to a maximum level restriction may be used to ensure that a frequently traversed journey does not visually obstruct other journeys, if graphically rendered. If the level counter is not less than a maximum level restriction, the method 300 may proceed to output results, at 306. On the other hand, if the level counter is less than a maximum level restriction, the method 300 may proceed to 314.

At 314, the method 300 determines whether a respective interaction has changed channels. In other words, the method 300 determines whether the previous channel of the respective interaction is the same as its current channel. If the channel has not changed, the method 300 may proceed to output results, at 306. On the other hand, if the channel has changed, the method 300 may proceed to 316.

At 316, the method 300 determines whether contact information for the respective interaction has changed. If the contact information has not changed, the method 300 may proceed to output results, at 306. On the other hand, if the contact information has changed, the method 300 may proceed to 318. At 318, the method 300 may concatenate the channel to the path, increase the level counter, and/or store contact information. The method 300 may then proceed to output results at 306.

The User Interface is generated in a manner to provide a straightforward display representative of the selectively mined customer data habits. The user experience and the intuitiveness of the display of the mined customer data habits are supported by the manner in which the presented data is eligible for further analysis. The analysis of the populated data in the Customer Journey diagram is beneficially supplemented or performed according to at least one of: increasing the visibility of a path; selecting, or multi-selecting, paths and/or Nodes for inclusion in the analysis; rendering contextual data from a Customer Journey diagram that is selected according to a point of click; providing additional methods for presentation of contextual data or action options; providing granular drilling information regarding a Customer Journey on demand; and by dynamically adjusting a point of focus according to a diagram selection.

The User Interface is generated in a manner to provide a straightforward user experience. To provide a straightforward user experience, users must have flexibility to select various data from the diagram. A straightforward user experience further provides for the selected user data, the ability to analyze the selection, and, when possible, details regarding 1) the classification of data selected by the user and 2) any further categorical information related to the user selection.

Dynamically Increasing the Visibility of a Path in a Customer Journey Diagram by Fading Out Non-Relevant Nodes and Paths The User Interface provides a plurality of paths, with each path representing a customer's trajectory through various interactions. In order to provide a straightforward user experience, according to an example embodiment, a user can select any one of the plurality of paths for the user's needs. A user selection is generally performed according to a click of an external device, such as a mouse, which results in a selection of the path using an associated cursor on the screen of the User Interface. In some example embodiments, another external device, such as a track pad or keyboard, is used to select the path in the diagram. In other example embodiments, a user interface is available on a touchscreen device and a click can instead be generated by a similar interactive technique on the touchscreen.

The selected path from the plurality of paths is accordingly eligible for further analysis by the user. In addition, the diagram provides the user with the option to receive the classification of the selected path and any further categorical information related to the user selection. To increase the visibility of the path, the selected path is emphasized in the diagram with one of: bolding, highlighting, a change in coloration, a change in shadowing, or another similar method known in the art used to provide an emphasis in a figure. According to another example embodiment, instead of emphasizing the selected path, the plurality of paths that are not selected are de-emphasized relative to the selected path by one of: fading, a change in coloration, a change in shadowing, or another similar method known in the art used to provide a de-emphasis in a figure. In some example embodiments, both the selected path is emphasized and the unselected paths are deemphasized.

By emphasizing a selected path or deemphasizing an unselected path, the diagram is more readily understandable by a user. The significant information available in the overall diagram is visually decoded so that the relative significance of the user selected path can be understood. The emphasis of the selected path (or the de-emphasis of the unselected paths) provides valuable, easily distinguishable information, related to the path's initial Node, each subsequent Node, and the final Node.

In some example embodiments, when a user path is selected only the single selected user path is emphasized. In other example embodiments, when a user path is selected, a user can proceed to make multiple selections and each of the selected paths is emphasized. In some example embodiments, multiple path selection and the emphasis of the multiple selected paths is a default method associated with the diagram. In other example embodiments, multiple path selection and emphasis is activated with a selection of a tool in a toolbar in the diagram or with a selection of a key (i.e., "shift") on a keyboard generally used to allow for multiple selections. When multiple user paths are selected, all of the multiple paths are emphasized. In some embodiments, when multiple user paths are selected, all of the unselected paths are deemphasized. In some embodiments, when multiple user paths are selected both the multiple paths are emphasized and the unselected paths are deemphasized. When multiple user paths are selected, in some embodiments, the multiple user paths are emphasized using different methods in order to distinguish between the multiple selected user paths.

In some example embodiments, all of the Nodes associated with the selected path are emphasized with one of: bolding, highlighting, a change in coloration, a change in shadowing, or another similar method known in the art used to provide an emphasis in a figure. In some example embodiments, all of the Nodes not associated with the selected paths are deemphasized relative to the selected path by one of: fading, a change in coloration, a change in shadowing, or another similar method known in the art used to provide a de-emphasis in a figure. According to some example embodiments, both the Nodes associated with the selected path are emphasized and the Nodes not associated with the selected path are deemphasized.

Figure 4A:
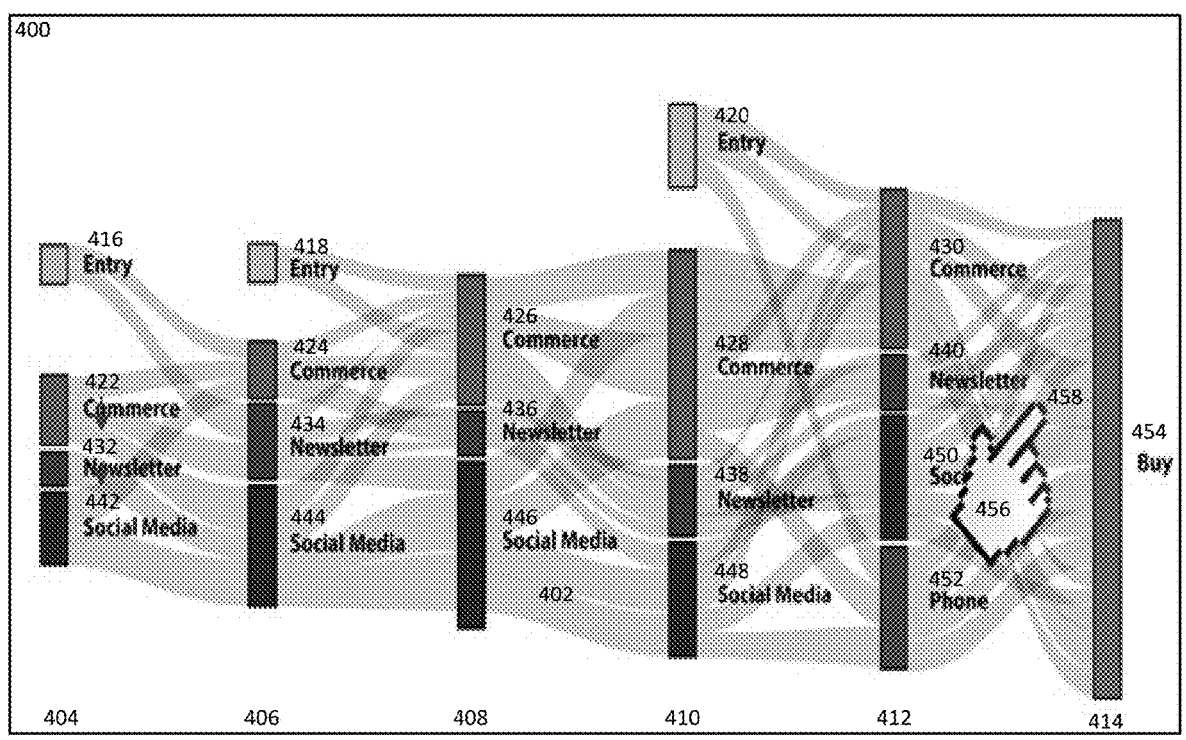
FIG. 4A is an illustration of a Customer Journey diagram 400 configured to increase the visibility of user selected paths.

FIG. 4A is an illustration of a Customer Journey diagram 400 configured to increase the visibility of user selected paths. For example, FIG. 4A, diagram 400 includes a plurality of paths 402. In some example embodiments, millions of paths are included in the plurality of paths. Each of the plurality of paths has a unique entry point and relationship with any one of the Nodes at various levels. Some paths begin at Level One 404, some paths begin at Level Two 406, while other paths begin at Level Four 410. In the displayed diagram 400, no entry points are provided at Level Three 408, Level Five 412, or Level Six 414. Overall, in the example diagram, the Nodes with which the paths interact include: Entry Level One 416, Entry Level Two 418, Entry Level Four 420, Commerce Level One 422, Commerce Level Two 424, Commerce Level Three 426, Commerce Level Four 428, Commerce Level Five 430, Newsletter Level One 432, Newsletter Level Two 434, Newsletter Level Three 436, Newsletter Level Four 438, Newsletter Level Five 440, Social Media Level One 442, Social Media Level Two 444, Social Media Level Three 446, Social Media Level Four 448, Social Media Level Five 450, Phone 452, and Buy 454.

From all of these various paths, a user can select a path for further information and or analysis. After the selection of the path, the user selected path is emphasized according to the foregoing with at least one of: emphasis of the user selected path or de-emphasis of the unselected paths. In FIG. 4A, a selection 456 of user path 458 is performed.

Figure 4B:
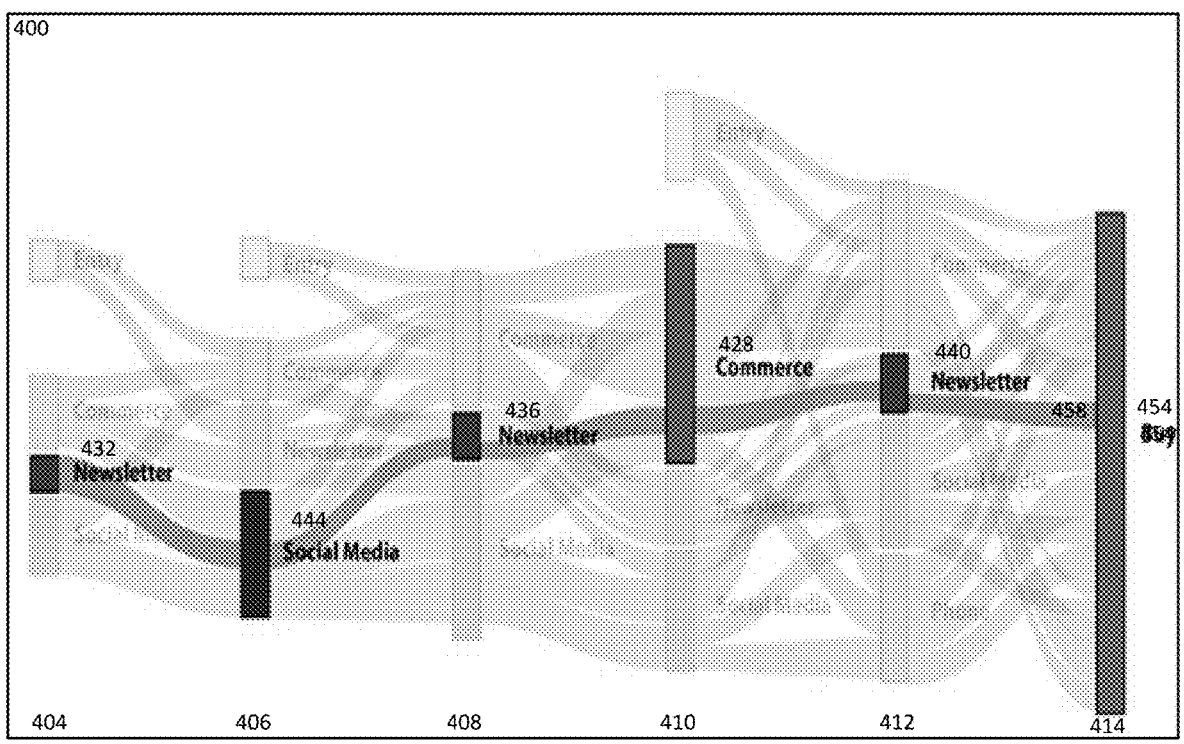
FIG. 4B is an illustration of another example embodiment of a Customer Journey diagram 400 configured to increase the visibility of the user selected paths.

FIG. 4B is an illustration of another example embodiment of a Customer Journey diagram 400 configured to increase the visibility of the user selected paths. FIG. 4B provides the resultant view of diagram 400 after the selection 456 of user path 458. The selected user path 458 is emphasized and the unselected paths are deemphasized such that it is clearly evident that the path interacted with Newsletter Level One 432, Social Media Level Two 444, Newsletter Level Three 436, Commerce Level Four 428, Newsletter Level Five 440, and Buy 454. Furthermore, these Nodes described as being associated with the selected path are emphasized and the Nodes not associated with the selected path are deemphasized.

Figure 4C:
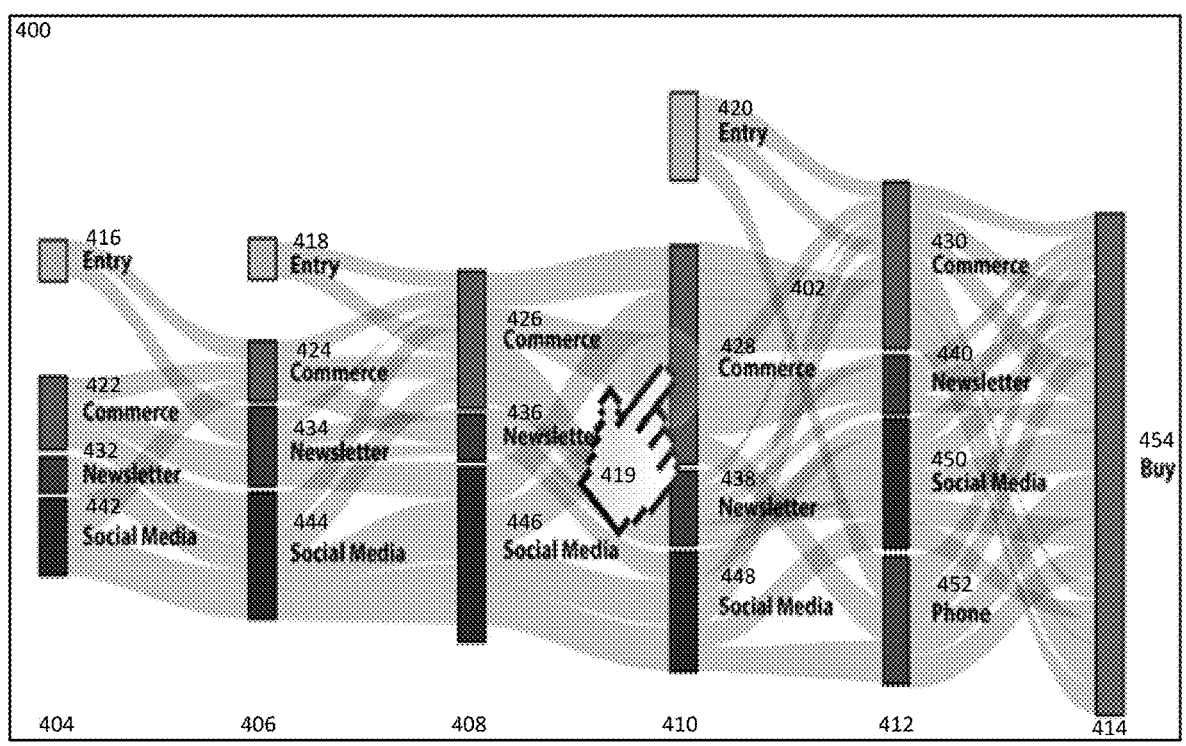
FIG. 4C is an illustration of a Customer Journey diagram 400 configured to increase the visibility of user selected nodes and associated paths.

FIG. 4C is an illustration of a Customer Journey diagram 400 configured to increase the visibility of user selected nodes and associated paths. For example, in FIG. 4C, diagram 400 includes a plurality of paths 402. Each of the plurality of paths has a unique entry point and relationship with any one of the Nodes at various levels. Some paths begin at Level One 404, some paths begin at Level Two 406, while other paths begin at Level Four 410. In the displayed diagram 400, no entry points are provided at Level Three 408, Level Five 412, or Level Six 414. Overall, in the example diagram, the Nodes with which the paths interact include: Entry Level One 416, Entry Level Two 418, Entry Level Four 420, Commerce Level One 422, Commerce Level Two 424, Commerce Level Three 426, Commerce Level Four 428, Commerce Level Five 430, Newsletter Level One 432, Newsletter Level Two 434, Newsletter Level Three 436, Newsletter Level Four 438, Newsletter Level Five 440, Social Media Level One 442, Social Media Level Two 444, Social Media Level Three 446, Social Media Level Four 448, Social Media Level Five 450, Phone 452, and Buy 454.

From all of these various paths, a user can select all paths associated with a particular node for further information and/or analysis. After selection of the node, the user selected node and all paths flowing through the user selected node are emphasized according to the foregoing with at least one of:

emphasis of the user selected node and associated paths or de-emphasis of the unselected nodes and paths not associated with the selected node. In. FIG. 4C, a selection 419 of the Commerce Node 428 is performed.

Figure 4D:
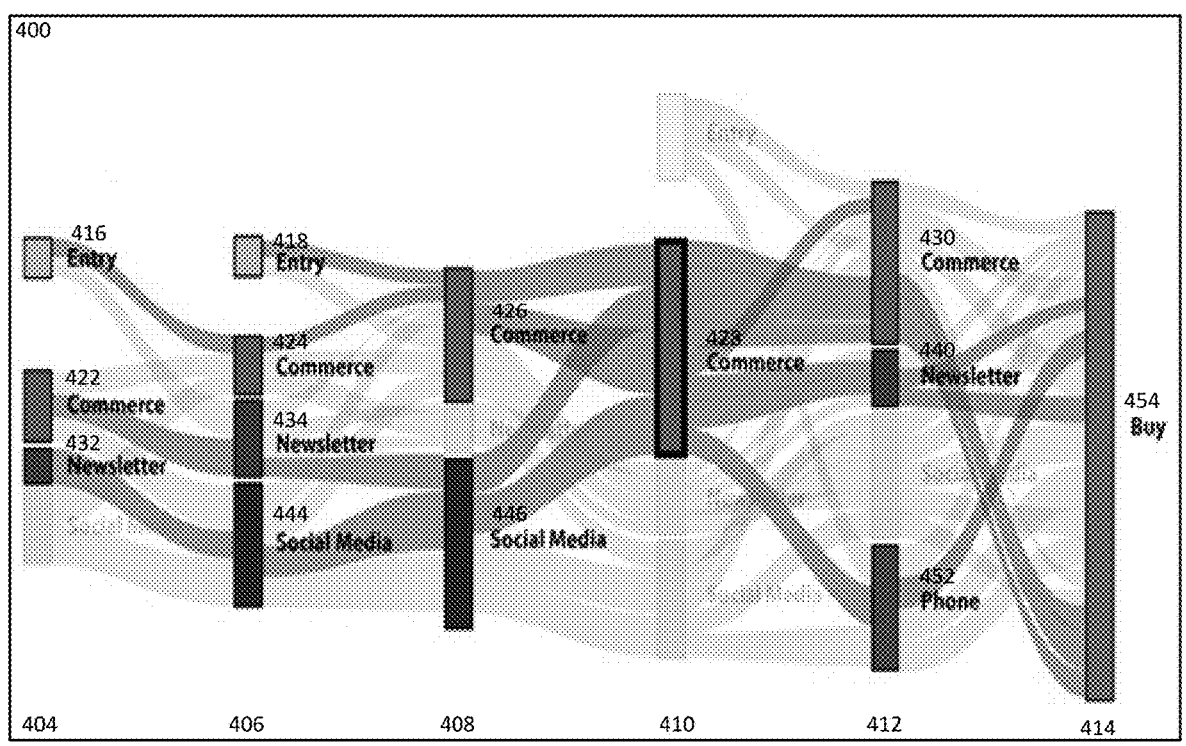
FIG. 4D is an illustration of another example embodiment of a Customer Journey diagram 400 configured to increase the visibility of user selected nodes and associated paths.

FIG. 4D is an illustration of another example embodiment of a Customer Journey diagram 400 configured to increase the visibility of user selected nodes and associated paths. FIG. 4D provides the resultant view of diagram 400 after the selection 419 of Node 428. The user selected node, 428, for Commerce is emphasized as well as all of the paths interacting with the node 428. All other paths, and nodes touching (only) these particular other paths, are deemphasized such that it is clear which paths have an interaction with Node. 428.

Mechanism to Select and Multi-Select Paths in a Customer Journey Diagram

The User Interface provides a plurality of paths, with each path representing a customer's trajectory through various interactions and each path being comprised of the series of links between Nodes. In order to provide a straightforward user experience, according to an example embodiment, a user can select a path by selecting any link in the path. Therefore, a selection of a link in a path, is extrapolated to a selection of the entire associated path. The entire associated path includes the selected link and each of the other links in the path. The user selection is generally performed according to a click of an external device, such as a mouse, which results in a selection of the link, between two Nodes, using an associated cursor on the screen of the User Interface. In some example embodiments, another external device, such as a track pad or keyboard, is used to select the link in the diagram. In other example embodiments, a user interface is available on a touchscreen device and a click can instead be generated by a similar interactive technique on the touchscreen.

Similarly, a user can select a plurality of paths by selecting any Node. The selection of the Node is extrapolated to a selection of every path that has a link adjacent to the Node. The resultant selection accordingly includes each of the paths flowing through the selected Node. In some embodiments, the selection of the Node further results in the selection of each node associated with the paths flowing through the selected Node. As with the foregoing, the user selection is generally performed according to a click of an external device, such as a mouse, which results in a selection of the Node, using an associated cursor on the screen of the User Interface. In some example embodiments, another external device, such as a track pad or keyboard, is used to select the Node in the diagram. In other example embodiments, a user interface is available on a touchscreen device and a click can instead be generated by a similar interactive technique on the touchscreen.

Figure 5A:
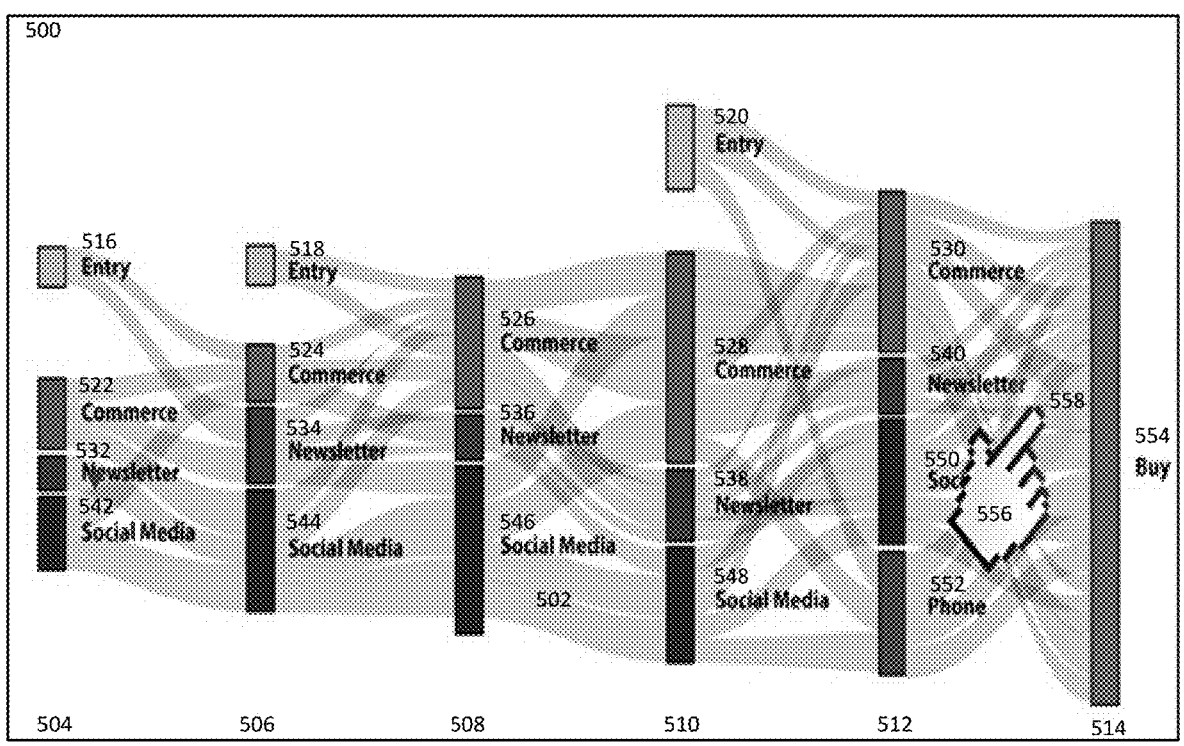
FIG. 5A is an illustration of a Customer Journey diagram 500 configured to extrapolate, from a selection of a link, a selection of an associated path.

FIG. 5A is an illustration of a Customer Journey diagram 500 configured to extrapolate, from a selection of a link, a selection of an associated path. For example, FIG. 5A diagram 500 includes a plurality of paths 502. In some example embodiments, millions of paths are included in the plurality of paths. Each of the plurality of paths has a unique entry point and relationship with any one of the Nodes at each various levels. Some paths begin at Level One 504, some paths begin at Level Two 506, while other paths begin at Level Four 510. In the displayed diagram 500, no entry points are provided at Level Three 508, Level Five 512, or Level Six 514. Overall, in the example diagram, the Nodes with which the paths interact include: Entry Level One 516, Entry Level Two 518, Entry Level Four 520, Commerce Level One 522, Commerce Level Two 524, Commerce Level Three 526, Commerce Level Four 528, Commerce Level Five 530, Newsletter Level One 532, Newsletter Level Two 534, Newsletter Level Three 536, Newsletter Level Four 538, Newsletter Level Five 540, Social Media Level One 542, Social Media Level Two 544, Social Media Level Three 546, Social Media Level Four 548, Social Media Level Five 550, Phone 552, and Buy 554. From all of these various paths, a user can select a link in order to designate an associated path for further information and or analysis. After the selection of the link, the entire path associated with the link is emphasized according to the foregoing. In FIG. 5A, a selection 556 of link 558 is performed.

Figure 5B:
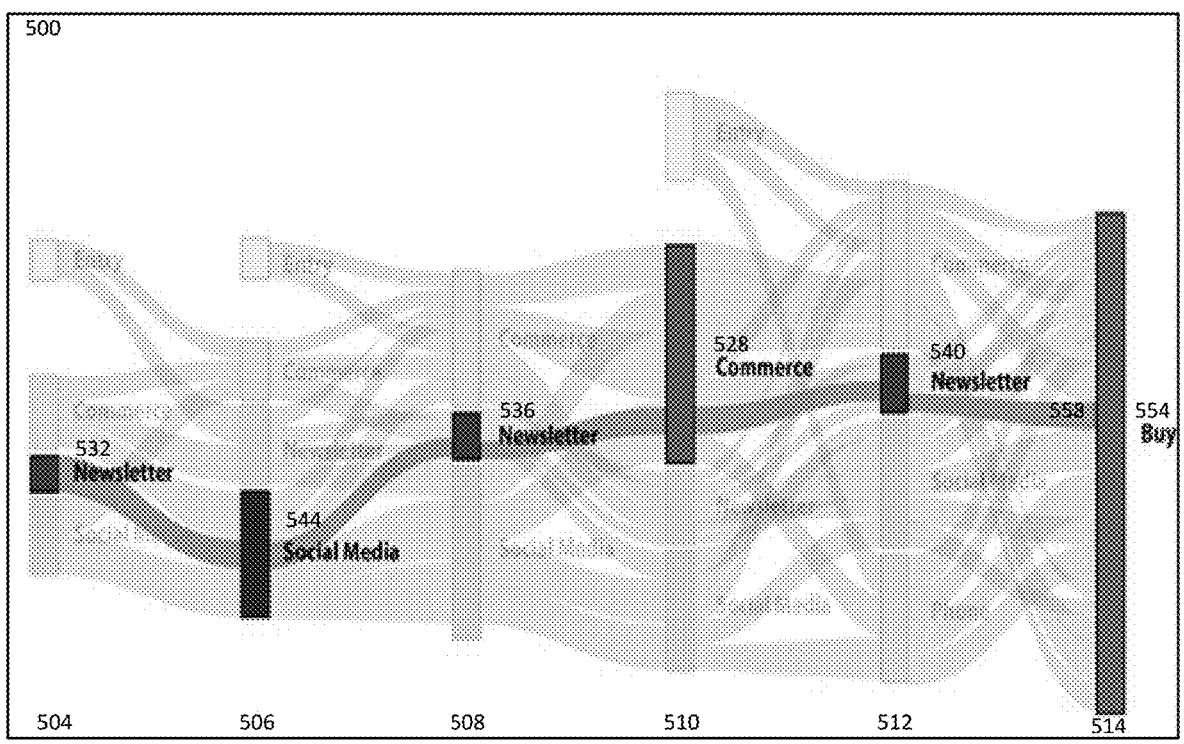
FIG. 5B is an illustration of another example embodiment of a Customer Journey diagram 500 configured to extrapolate, from a selection of a link, a selection of an associated path.

FIG. 5B is an illustration of another example embodiment of a Customer Journey diagram 500 configured to extrapolate, from a selection of a link, a selection of an associated path. FIG. 5B provides the resultant view of diagram 500 after the selection 556 of link 558. The entire path associated with link 558, which was only the subset of the path between Level Five 512 and Level Six 514, is selected and emphasized. With the emphasis shown in FIG. 5B, a user can now clearly discern that the path interacted with Newsletter Level One 532, Social Media Level Two 544, Newsletter Level Three 536, Commerce Level Four 528, Newsletter Level Five 540, and Buy 554. Furthermore, these Nodes described as being associated with the selected path are emphasized and the Nodes not associated with the selected path are deemphasized.

Figure 5C:
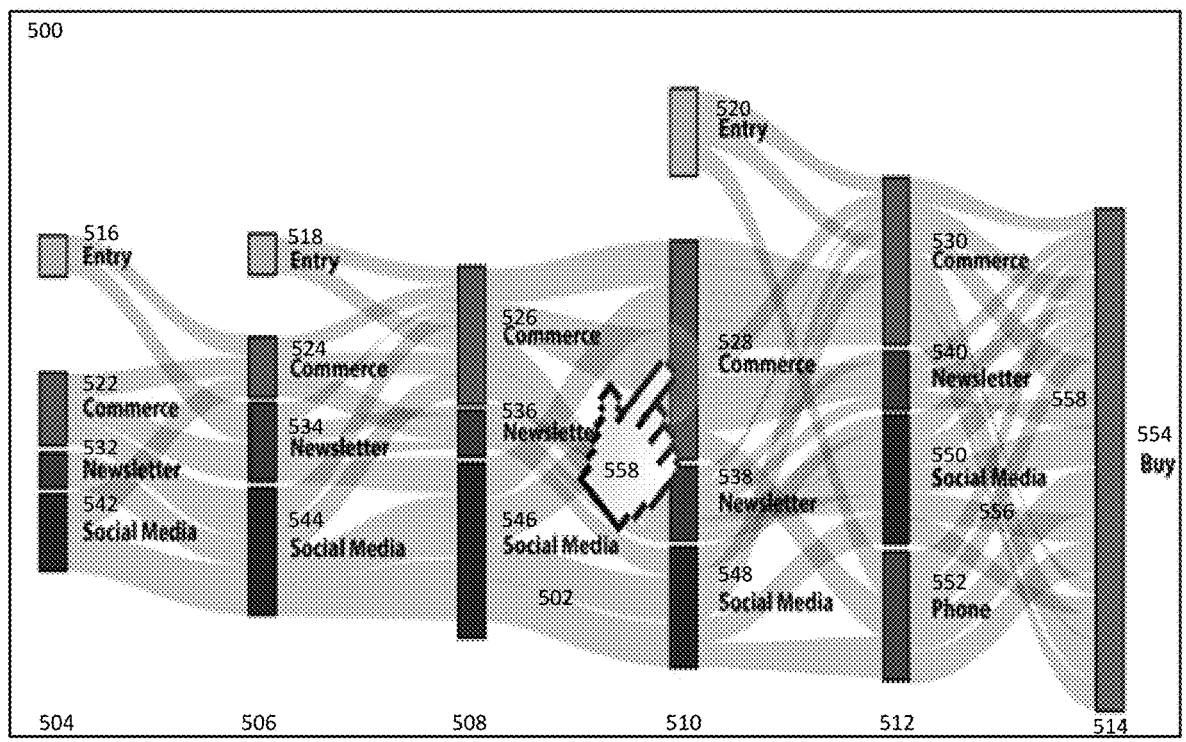
FIG. 5C is an illustration of a Customer Journey diagram 500 configured to extrapolate, from a selection of a Node, a selection of all associated nodes according to common paths.

FIG. 5C is an illustration of a Customer Journey diagram 500 configured to extrapolate, from a selection of a Node, a selection of all associated nodes according to common paths. As a further example, FIG. 5C displays diagram 500 that includes a plurality of paths 502. In some example embodiments, millions of paths are included in the plurality of paths. Each of the plurality of paths has a unique entry point and relationship with any one of the Nodes at each various levels. From all of these various paths and Nodes, a user can select a Node in order to designate all associated paths for further information and or analysis. After the selection of the Node, each associated path is emphasized according to the foregoing. In FIG. 5C, a selection 558 is made of Node, Commerce Level Four 528.

Figure 5D:
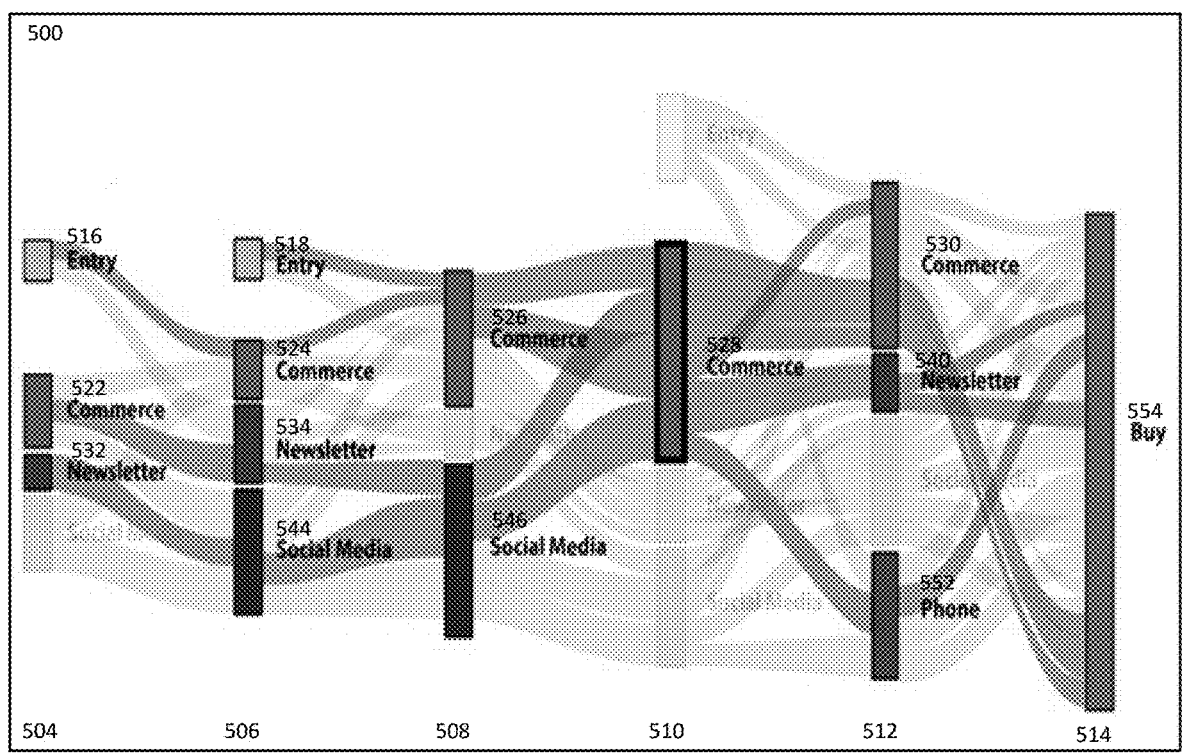
FIG. 5D is an illustration of another example embodiment of a Customer Journey diagram 500 configured to extrapolate, from a selection of a Node, a selection of all associated nodes according to common paths.

FIG. 5D is an illustration of another example embodiment of a Customer Journey diagram 500 configured to extrapolate, from a selection of a Node, a selection of all associated nodes according to common paths. FIG. 5D provides the resultant view of diagram 500 after the selection 558 results in the selection of Node 528. All of the associated paths are emphasized such that it is clearly evident that each of the emphasized paths interacted with selected Node Commerce Level Four 528. In some embodiments, the selected Node is emphasized to a greater extent than the other Nodes interacting with the selected paths. For example, in FIG. 5D, Commerce Level Four 528 is bolded to emphasize that it was the feature of the diagram selected by the user.

Derive and Render Contextual Data from a Diagram Point of Click

The User Interface provides a plurality of paths, with each path representing a trajectory of a customer's various interactions. In order to provide a straightforward user experience, according to an example embodiment, a user can select any one of the plurality of paths. A user selection is generally performed according to a click of an external device, such as a mouse, which results in a selection of the path using an associated cursor on the screen of the User Interface. In some example embodiments, another external device, such as a track pad or keyboard, is used to select the path in the diagram. In other example embodiments, a user interface is available on a touchscreen device and a click can instead be generated by a similar interactive technique on the touchscreen.

The selected path from the plurality of paths is accordingly eligible for further analysis by the user. In addition, the diagram provides the user with the option to receive the classification of the selected path and any further categorical information related to the user selection. Any time a user selects one of a Node or a link, the diagram provides the user with contextual advance display data corresponding to the user's point of click. When a user clicks on a portion of the diagram, the diagram renders and provides to the user business insight data relative to the point of click. As an example, contextual data provided to the user in the diagram can include the number of customers associated with a selected path or paths where a click performed the selections. Contextual data can further include the revenue generated from sales made to the customers associated with a selected path or paths. Other contextual data for paths representing customers associated with a selected path or paths, can include, but is not limited to: sentiment score, a gender, an educational level, a marital status, a household role status, and other statistical demographic or customer related information that is known to those of skill in the art.

Figure 6A:
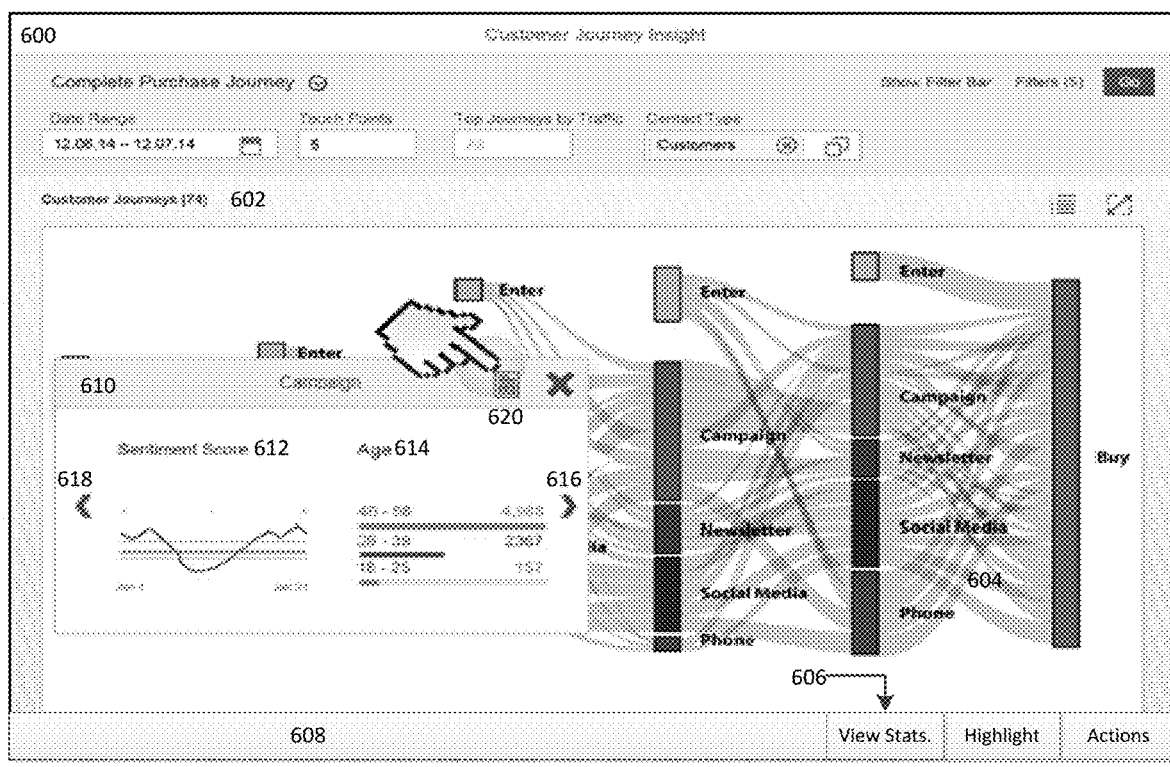
FIG. 6A is an illustration of a Customer Journey diagram 600 configured to provide analysis or contextual data according to the user's selection.

FIG. 6A is an illustration of a Customer Journey diagram 600 configured to provide analysis or contextual data according to the user's selection. For example, in FIG. 6A, diagram 600 includes a Customer Journey display 602 containing plurality of paths 604. For a current selection of paths, a user can view contextual data. The user, after making the selection of relevant paths, has proceeded to select a "View Statistics" button 606 on the dashboard 608 of the diagram. As a result of the selection of button 606, a dialog box 610 including the available contextual data is presented to the user. A user can view, for the current selection, a Sentiment Score shown in chart 612, an Age Score shown in chart 614, and other available information by selecting one of forward arrow 616 or backward arrow 618. By selecting icon 620, the user can further alter the contextual data shown in the dialog box and the order in which the contextual data is presented. For example, the user could select to see Gender information first, and deselect the Sentiment Score option as the Sentiment score is irrelevant to an analysis of the data under the particular circumstances.

The selected path from the plurality of paths is accordingly eligible for application of further actions by the user. In addition, the diagram provides the user with at least one action to apply to the selected paths. Any time a user selects one of a Node or a link, the diagram provides the user with an option to apply an action to the paths corresponding with the user's point of click. When a user clicks on a portion of the diagram, the diagram provides the user with an option to apply an action. In some example embodiments, the actions are presented to the user after the selection click via, for example, a pop out box. In other example embodiments, the actions are presented to the user after the selection click via a keyboard shortcut. In some example embodiments, the actions are presented to the user after the selection click via a follow up click of an icon in the diagram or a click shortcut, for example, a right click.

Actions made available to the user can include any analysis functionality applicable to the data depicted in the diagram. For example, with marketing data, the potential actions available for manipulation by the user include: "Create Segmentation Model", "Create Target Group", and "Show KPI." Other actions, applicable to other industries and data sets provided on the diagram and known in the respective industries are incorporated herein. In addition, more generic actions, applicable across industries should be considered incorporated herein. For example, an action provided as an option to the user can include: "Email Diagram", "Email Current Display", "Share Saved Filter Options", and "Share Model/Group."

Figure 6B:
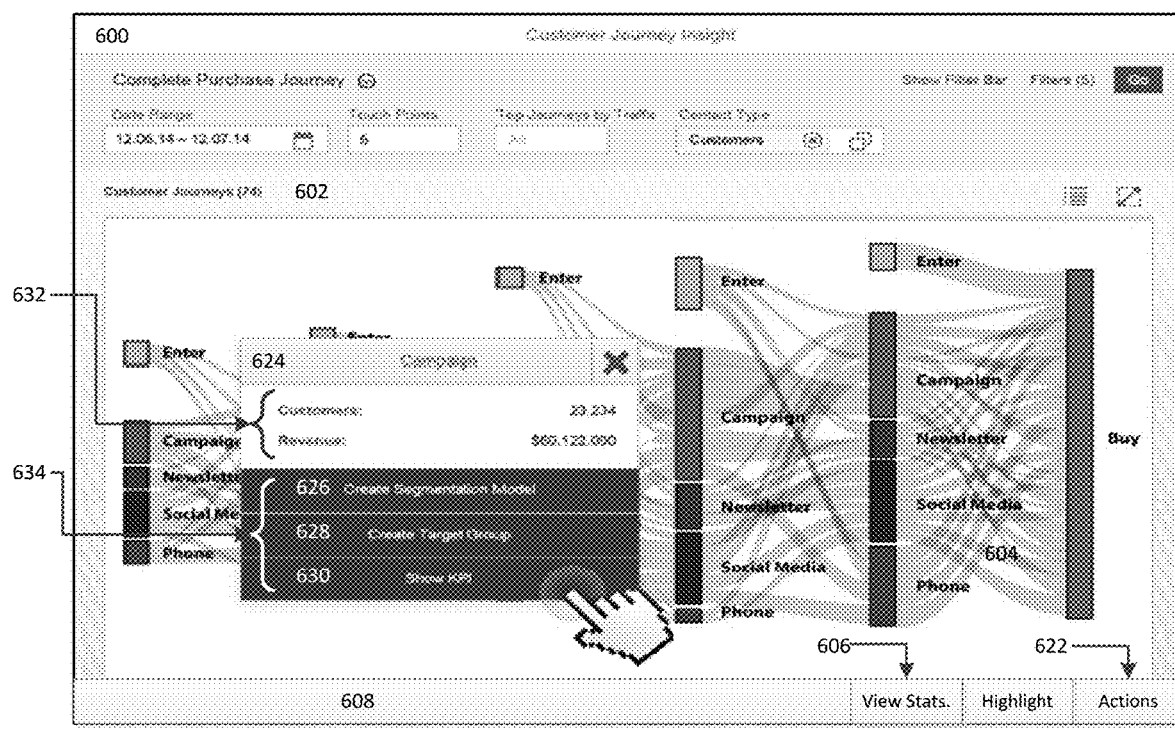
FIG. 6B is an illustration of another example embodiment of Customer Journey diagram 600 configured to provide analysis or contextual data according to the user's selection.

FIG. 6B is an illustration of another example embodiment of Customer Journey diagram 600 configured to provide analysis or contextual data according to the user's selection. FIG. 6B displays diagram 600, which includes a Customer Journey display 602 that in turn contains plurality of paths 604. For a current selection of paths, a user can designate an Action. The user, after making the selection of relevant paths, has proceeded to select an "Actions" button 622 on the dashboard 608 of the diagram. As a result of the selection of button 622, a dialog box 624 including the available Actions is presented to the user. A user can view, for the current selection, possible actions that include: "Create Segmentation Model" 626, "Create Target Group" 628, and "Show KPI" 630. In some example embodiments, both contextual information (i.e., "Customers: 23,234" and "Revenue: $60,122,000") 632 and Actions 634 are available upon selection of the "Actions" button 622.

When an Action Button, or a button associated with the delivery or contextual data, is selected, the necessary data is dynamically retrieved according to the point of click by the user. By performing a dynamic retrieval, and storing the information associated with the request, the user is able to view, via the User Interface, the most relevant and recent information as it is included in the database. To perform the dynamic retrieval, the system stores, in memory, at least each of the following: the Context of the request, the Point of Click, the Click, the Content, and the Query needed to perform the dynamic retrieval. For example, the Context indicates to the system the relevant database to be searched for pertinent information. A Context can be any relevant Business Context such as: Auditing, Shipping, Technical Services, and Marketing. Although many business contexts are considered incorporated herein, Marketing is generally used as a representative example. The Point of Click could be either of a NODE or a PATH. The Point of Click further specifies, the exact information associated with the NODE (i.e., Campaign) and the PATH (i.e. Campaign—Social). Click establishes whether the data associated with the rendering is to be presented to the user on a single click or with two clicks. Content includes the data requested by the User. For example, the Content could include the contextual data described in the foregoing or a specific action request. Query includes the line item provided to the system by which the requisite data set, needed to provide to the requested Content in the associated Context, is requested. Responsive to the query, there may be data received or the system may, responsive to authorization, retrieve the data autonomously.

FIG. 7 is an illustration of a Dynamic Build Table 700 generated to support rendering contextual data or analysis related to a Customer Journey diagram. FIG. 7 displays table 700 includes a plurality of entries 702, 704, and 706 in a Dynamic Build table as described in the foregoing. The Dynamic Build Table stores data related to Context 708, Point of Click 710, Click 712, Content 714, and Query 716. Entry 702 describes a dynamic rendering which can be performed according to Query 718. Query 718 retrieves data relevant to a Marketing Context for a NODE associated with Campaign. The retrieval is performed upon a single click, and provides, specifically, content related to the contextual data of a Sentiment Score. Entry 704 describes a dynamic rendering which can be performed according to Query 720. Query 720 retrieves data relevant to a Marketing Context for a NODE associated with Campaign. The retrieval is performed upon a single click, and provides, specifically, content related to the contextual data of a customer Age. Entry 706 describes a dynamic rendering which can be performed according to Query 722. Query 722 retrieves data relevant to a Marketing Context for a PATH associated with Campaign, specifically any path that proceeds through the Social Nodes. The retrieval is performed upon a double click, and provides, specifically, content related to the contextual data of a Number of Customers in the selected paths and the Revenue generated.

Figure 8:
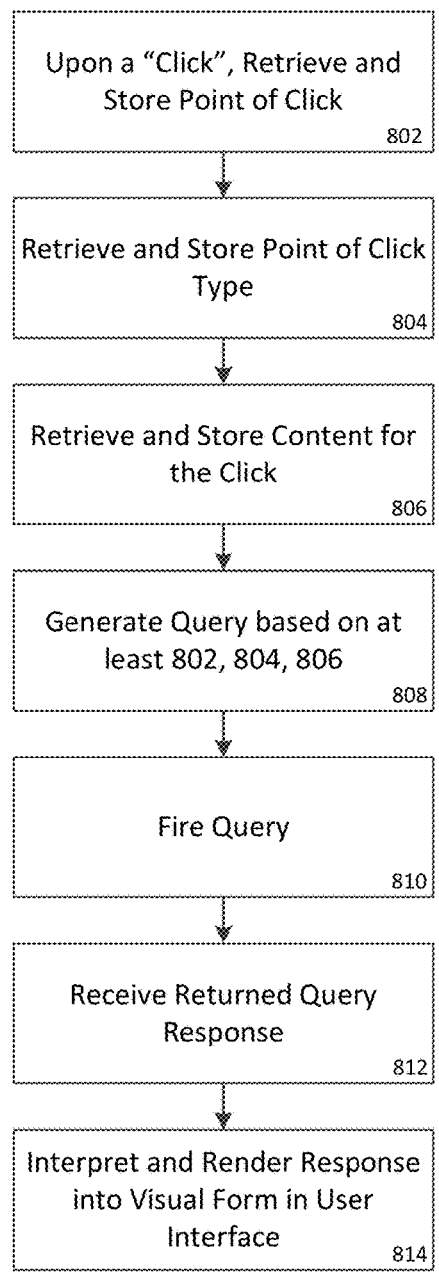
FIG. 8 is an illustration of a process 800 to generate a Dynamic Build Table and render contextual data or analysis related to a Customer Journey diagram.

FIG. 8 is an illustration of a process 800 to generate a Dynamic Build Table and render contextual data or analysis related to a Customer Journey diagram. FIG. 8 illustrates a flowchart 800 of a dynamic build utilizing the above described Dynamic Build table. When an Action Button, or a button associated with the delivery or contextual data, is selected, the system performs at least the following steps to render the diagram and/or the data/action requested by the User. First, at 802, upon the User's "Click", which is one of single or double, related to a selection of paths and/or Nodes, the system retrieves the point of click and stores the information in an entry in a Dynamic Build table. At 804, the system retrieves the "Point of Click" type and stores the information in an entry in a Dynamic Build table. At 806, the system retrieves the "Content" for the associated point of click type based on the Context. Based on the stored Point of Click, Point of Click Type, and Content, a Query is generated at 808. In some embodiments, the generated Query is stored in the Dynamic Build table. The Query is fired at 810. At 812, the response from the query is returned. At 814, the returned results from the query are interpreted and rendered in visual form for the user in the diagram. In some example embodiments, the returned results are returned based on a retrieval performed by the system. In other example embodiments, the returned results are provided by an external system to the current system.

Methods and Techniques to Present Additional Contextual Statistical Data in a Customer Journey Diagram The User Interface of the diagram can be rendered in accordance with various configurations according to default settings or customization settings. In some embodiments, the flow of paths and Nodes, shown in a Customer Journey, commands the entirety of the available space on the User Interface. In other example embodiments, the User Interface includes a Journey Flow section as well as at least one of a Filter Section, a Toolbar Section, a Contextual Data section, and an Action section.

Figure 9A:
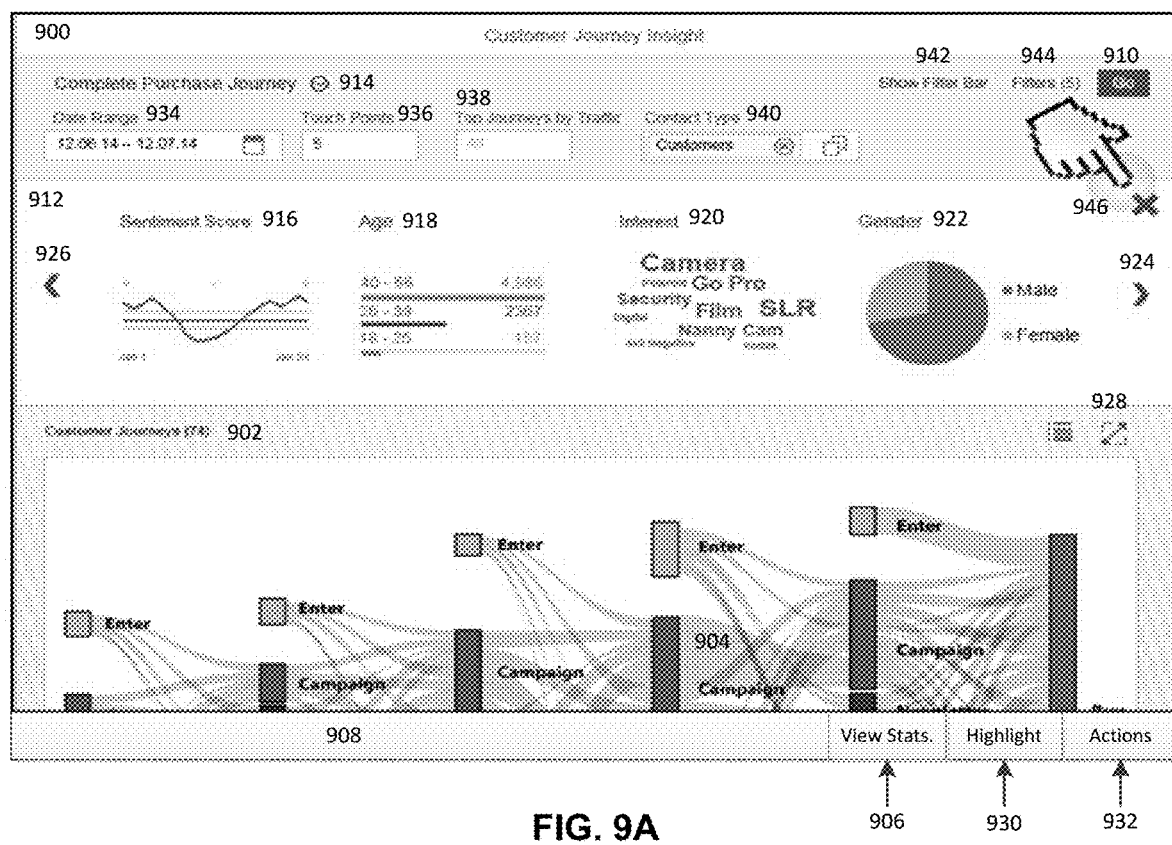
FIG. 9A is an illustration of an interactive bar in the Customer Journey diagram 900 that presents rendered contextual data or analysis related to the Customer Journey diagram.

FIG. 9A is an illustration of an interactive bar in the Customer Journey diagram 900 that presents rendered contextual data or analysis related to the Customer Journey diagram. For example, in FIG. 9A, diagram 900 includes a Customer Journey 902 containing a plurality of paths 904. For a current selection of paths, a user can view contextual data. The user, after making the selection of relevant paths, has proceeded to select a "View Statistics" button 906 on the dashboard 908 of the diagram. As a result of the selection of button 906, or as a selection of "Go" button 910, a contextual data panel 912 including the available contextual data is presented to the user. In some example embodiments, prior to the selection of the "Go" button 910, the user enters criteria in the Filter Bar 914. In some example embodiments, the contextual data is presented as a default, and there is no need for the user to click the "View Statistics" button 906 after having made the selection of paths in the Customer Journey 902. In the default environment, a selection of the paths will result automatically in a rendering of charts included in the contextual data panel 912.

In the Contextual Data Panel 912, a user can view, for the current selection, a Sentiment Score shown in chart 916, an Age Score shown in chart 918, Interests shown in chart 920, Gender shown in chart 922, and other available information by selecting one of forward arrow 924 and backward arrow 926. In some example embodiments, the Contextual Data Panel 912 can be closed by a user selection of an Exit key/Button 946.

In some example embodiments, as shown in FIG. 9A, diagram 900 includes a Contextual Data panel 914 available at the top portion of the User Interface. In some example embodiments, also shown in FIG. 9A, a Filter Bar 914 is further available above the Contextual Data panel 912. Beneath the Filter Bar 914 and the Contextual Data panel 912 is the portion of the User Interface containing the Customer Journey 902. In some example embodiments, the total number of Customer Journeys, or paths, is provided as a statistic automatically on the screen. For example, in FIG. 9A, the number of Customer Journeys visible according to the criteria entered in the Filter Bar 914 shown is 74. A user can further decide to enter into a full screen mode composed entirely of the Customer Journey map by selecting full screen button 928. At the very bottom of the screen is a dashboard, displaying additional tool selections including: Highlight 930 and Actions 932.

The Filter Bar 914 includes filter criteria related to: a Date Range 934, a Number of Touch Points 936, a Top Journey by Traffic 938, and Contact Type 940. Filter Bar can be Shown or Hidden by Selection of "Show Filter Bar" 942. The number of Filter Criteria can be modified by selection of "Filters (X)" 944 button, which as shown in FIG. 9A includes 5 criteria. In some example embodiments, the Filter Criteria can update the results displayed in the diagram in real-time, as the changes to the filter criteria are entered. In other example embodiments, the Filter Criteria can update the results displayed in the diagram upon selection of a "Go" button 910.

Figure 9B:
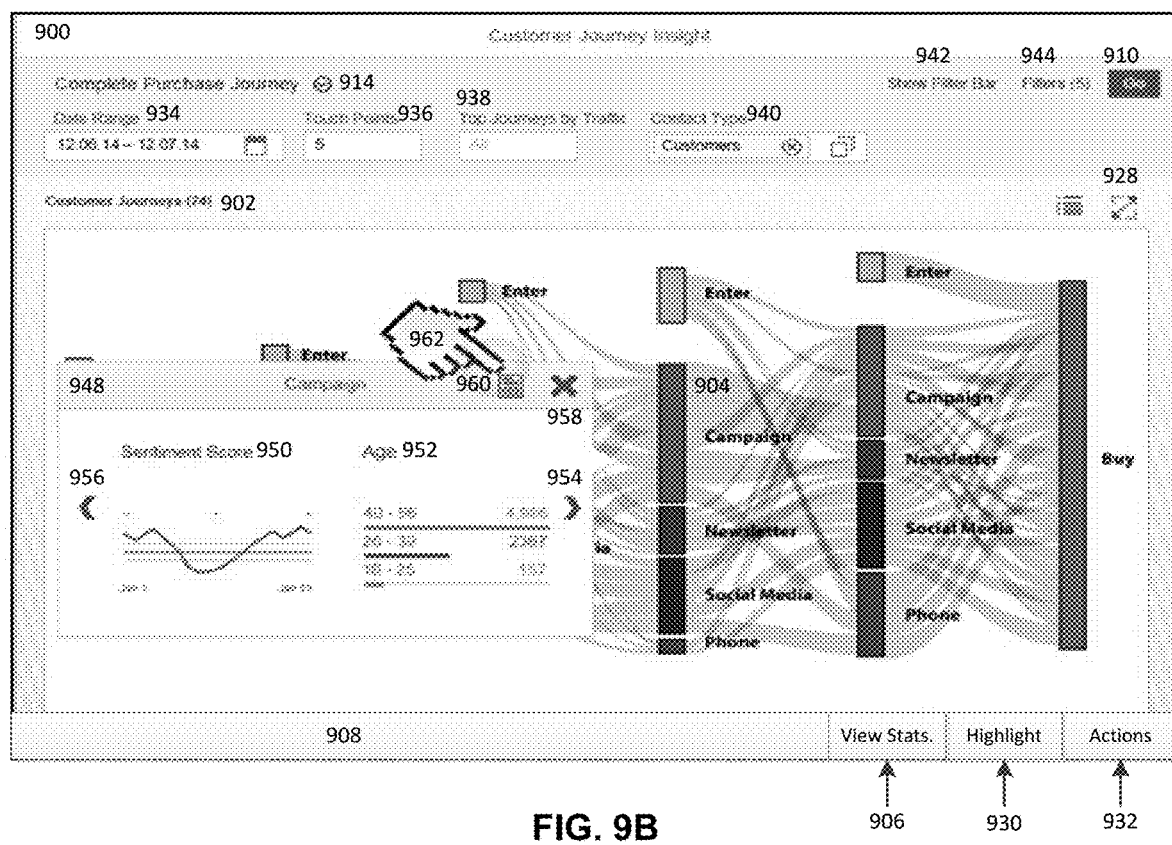
FIG. 9B is an illustration of another example embodiment of an interactive bar in the Customer Journey diagram 900 that presents rendered contextual data or analysis related to the Customer Journey diagram.

FIG. 9B is an illustration of another example embodiment of an interactive bar in the Customer Journey diagram 900 that presents rendered contextual data or analysis related to the Customer Journey diagram. FIG. 9B illustrates diagram 900 including the Customer Journey 902 containing the plurality of paths 904. For the current selection of paths, a user can view in a dialog box, the contextual data or select an action to take on the selected paths. The user, after making the selection of relevant paths, has proceeded to select an "View Statistics" button 906 on the dashboard 908 of the diagram. As a result of the selection of button 906, or as a selection of "Go" button 910, a dialog box 948 including the available contextual data is presented to the user. In some example embodiments, prior to the selection of the "Go" button 910, the user enters criteria in the Filter Bar 914. In some example embodiments, the contextual data is presented as a default, and there is no need for the user to click the "View Statistics" button 906 after having made the selection of paths in the Customer Journey 902. In the default environment, a selection of the paths will result automatically in a rendering of charts included in the dialog box 948.

In the dialog box 948, a user can view, for the current selection, a Sentiment Score shown in a chart 950, an Age shown in a chart 952, and other information that is available by selecting one of forward arrow 954 and backward arrow 956. In some example embodiments, the dialog box 948 can be closed by a user selection of an Exit key/button 958. By selecting, via selection 962, icon 960, the user can further alter the contextual data shown in the dialog box and the order in which the contextual data is presented. For example, the user could select to see Gender information first, and deselect the Sentiment Score option as the Sentiment score is irrelevant to an analysis of the data under the particular circumstances.

Figure 9C:
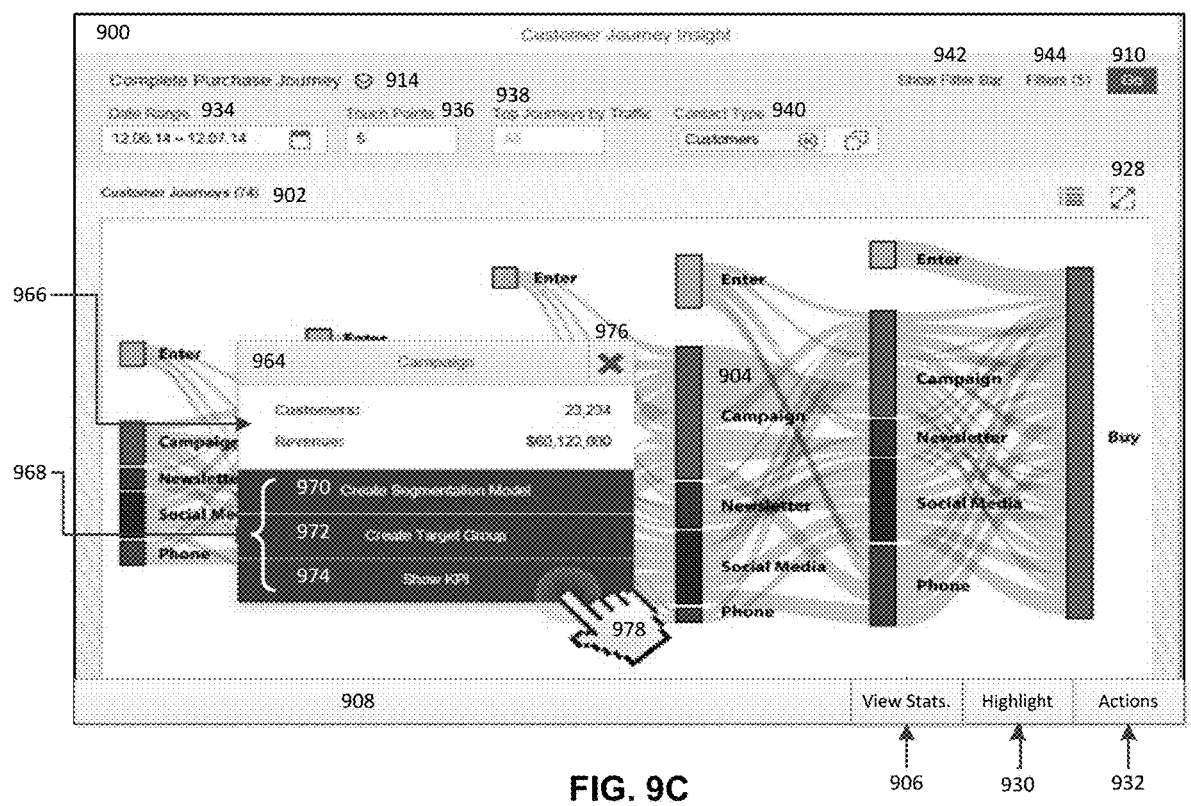
FIG. 9C is an illustration of another example embodiment of an interactive bar in the Customer Journey diagram 900 that presents rendered contextual data or analysis related to the Customer Journey diagram.

FIG. 9C is an illustration of another example embodiment of an interactive bar in the Customer Journey diagram 900 that presents rendered contextual data or analysis related to the Customer Journey diagram. FIG. 9C illustrates diagram 900 including the Customer Journey 902 containing the plurality of paths 904. For the current selection of paths, the user can view in a dialog box, either the related contextual data or select an action to be performed on the selected paths. The user, after making the selection of relevant paths, has proceeded to select an "Actions" button 932 on the dashboard 908 of the diagram. As a result of the selection of button 932, a dialog box 964 including the available actions are presented to the user. A user can view, for the current selection, some preliminary contextual data 966 (i.e., Customers and Revenue) as well as the available actions 968. The available actions 968 in the dialog box 964 include: "Create Segmentation Model" 970, "Create Target Group" 972, and "Show KPI" 974. The user can further opt to not select any actions at the time and instead select the close button 976 to return to the Customer Journey Diagram 902. By selecting 978 an action, such as "Show KPI" 974, the system fetches and compiles in real time statistics. The statistics can further be rendered into chart or graphic form in a panel, such as the Contextual Data panel 912 shown in FIG. 9A, or in a dialog box 948 such as the example shown in FIG. 9B.

FIG. 10 illustrates a Customization Table 1000 for the Customer Journey diagram that provides possible configurations of the displays to be rendered on the User Interface. As an example embodiment, the initial configuration of the User Interface includes at least the Customer Journey diagram. All other configurations, and defaults, are customizable according to revision of the Customization Table or addition to the Customization Table. A configuration of the User Interface upon loading of the program, or upon a user click, is entirely customizable. The customization table includes various entries to specify the placement and details of the statistics to be rendered according to the user selections. The customization table is stored in memory but made available, on the User Interface, to the user for the customization purposes upon a request. For example, the User Interface, upon initialization prompts the user to determine the user preferences for which statistics are rendered and the placement of the statistics rendered. In some embodiments, the User Interface includes a customization button that allows later access to the customization table.

The system stores, in memory and in the customization table, at least each of the following: the Context, the User Action, the Type of Chart, the Data, and the Position. For example, the Context indicates to the system the relevant database to be searched for pertinent information. A Context can be any relevant Business Context such as: Auditing, Shipping, Technical Services, and Marketing. Although many business contexts are considered incorporated herein, Marketing is generally used as a representative example. The User Action indicates the action that results in the rendering of the diagram. For example, a diagram may be rendered upon any of: loading of the program, clicking of a Node, or clicking of a path. A Type of chart can include, at least the following charts, although other charts known to those of ordinary skill in statistics and mathematics are further considered incorporated herein: line charts, horizontal bar charts, cloud charts, pie charts, and delocalization charts. The Data includes any information available related to the above described contextual data and include at least: Sentiment Score, Age, Interest, Gender, and Map. The Position refers to the relative placement of the rendered chart in comparison to the Customer Journey chart. Alternatively, the Position refers to the relative placement of the rendered chart in the context of the User Interface.

In FIG. 10, table 1000 includes a plurality of entries 1002, 1004, 1006, 1008, 1010, 1012, 1014, 1016, 1018, and 1020 in a Configuration table as described in the foregoing. Additional entries, such as entry 1022, can be added by the user. The Configuration Table stores data related to Context 1024, User Action 1026, Type of Chart 1028, Data 1030, and Position 1032. As an example, entry 1002 describes a Marketing business context configuration of the User Interface. Entry 1002 further specifies that, upon loading of the User Interface, a line chart is to be rendered including sentiment score data for the Customer Journey diagram. 1002 further indicates that the rendered chart of sentiment score is placed at the top of the User Interface. According to an example embodiment, a user can add as many configurations to the configuration table as desired. In some example embodiments, a maximum number of configurations can be entered by the user. In other example embodiments, a predetermined number of configurations of the table cannot be overwritten or removed.

Figure 11:
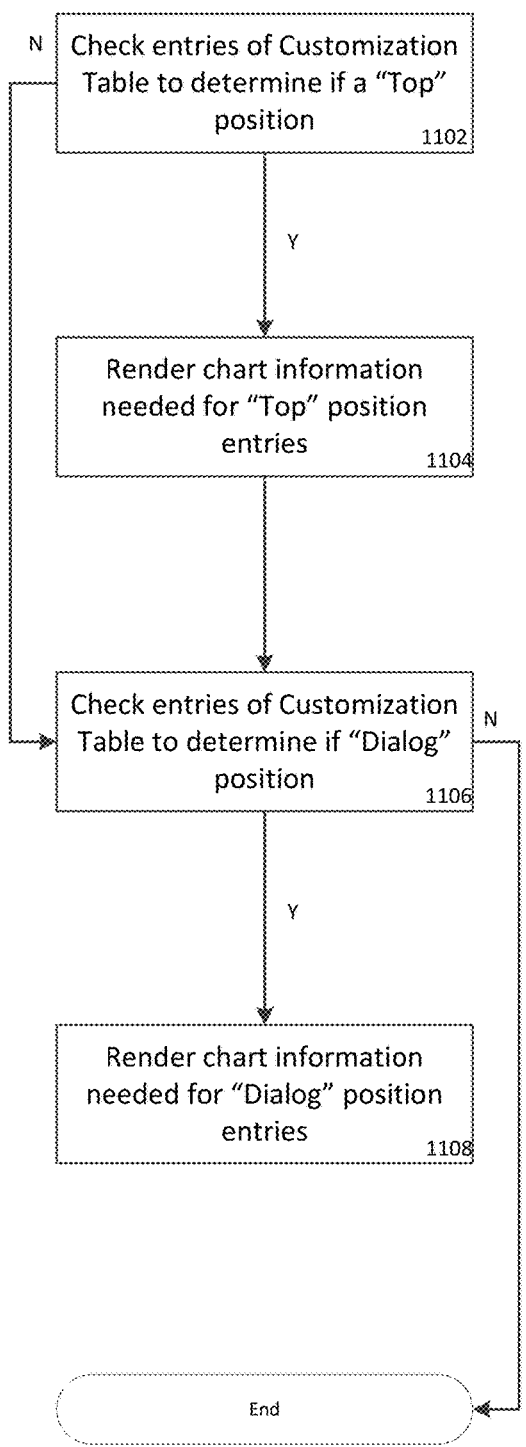
FIG. 11 illustrates a flowchart 1100 detailing the procedure to render the User Interface in accordance with the Customization Table.

FIG. 11 illustrates a flowchart 1100 detailing the procedure to render the User Interface in accordance with the Customization Table. When a Configuration Table is available that dictates the customizations and rules for rendering actions and contextual data, the system performs at least the following steps to render the diagram and/or the data/action. First, at 1102, on a load of the program, the system determines whether any entries have a "Position" rule of "Top." If so, at 1104, the system renders all chart information needed for these particular entries. To do so, the program runs all of the data associated with these queries asynchoronously. The results from the queries are then pushed to the User Interface and rendered into chart Form. If not, or following 1104 and at 1106, the system determines whether any entries have a "Position" rule of "Dialog." If so, at 1108, the system renders all chart information needed for these particular entries. To do so, the program must retrieve the clicked diagram item information (i.e., the selected Node(s) and/or the selected path(s)). After retrieving the clicked diagram item information, the associated accounts are retrieved. Then, all data queries for the associated accounts are run. The results from the queries are then pushed into the User Interface and rendered into chart form in a dialog box. If not, the process ends. In some example embodiments, the chart for the Customer Journey is rendered in advance of the procedure 1100. In other example embodiments, the chart for the Customer Journey is rendered after the procedure 1100. In other example embodiments, the location of the Customer Journey in the User Interface alters the timing of when the Customer Journey is rendered.

Method to Present Multi-Level Granularity of Data (Drilling Down, Drilling Up) on a Customer Journey Diagram As described in the foregoing, the User Interface provides a plurality of paths, with each path representing an interaction. In order to provide a straightforward user experience, according to an example embodiment, a user can select additional ways in which to alter the display of the useful insights from the Customer Journeys to the user. In particular, when a flow of data includes voluminous data, categorized by large numbers of Nodes and lines an additional categorization display method is useful to employ. To address these circumstances, the system uses a multi-level data granularity technique. In part, the multi-level data granularity technique involves the relationship between Nodes and the nesting of Nodes. When Nodes are expanded, to provide additional visual information regarding lower level Nodes in a nest, this is referred to as a "drill down." When Nodes are contracted, to provide less visual information regarding lower level Nodes in a nest, this is referred to as a "drill up."

As an example, a Node referred to as "EMAIL" can be a nested Node and included as part of the multi-level data granularity technique. The data nested within the "EMAIL" Node can be varying and is not limited to the provided examples. The data nested within the email Node can, furthermore, be extended to any sort of data related to email that is stored in the associated backend data. For example, "EMAIL" nested Nodes could refer to: type of e-mail service provider (e.g., GMAIL, Hotmail, Outlook), the email field within which the customer was included (e.g., TO, CC, BCC), and so on. Accordingly, a Customer Journey Diagram that includes three chains that are initially represented as Nodes include: [1] INTERNET, EMAIL, BUY; [2] INTERNET, STORE, EMAIL, BUY; and [3] PHONE, STORE, EMAIL, BUY are expanded accordingly. Customer Journey [1] includes: INTERNET, GMAIL, BUY; Customer Journey [2] includes: INTERNET, CIRCUIT CITY, HOTMAIL, BUY; and Customer Journey [3] includes: PHONE, BEST BUY, OUTLOOK, BUY. The additional information can be useful for statistical purposes. In an example embodiment, any Node in the diagram can be expanded or contracted. In another example embodiment, only a subset of Nodes in the diagram can be expanded or contracted.

The provided program and User Interface include at least two methods to drill down/up. In some embodiments, the data in the User Interface is subjected to a drill down/up according to a filter option. An example of the filter option is included in FIG. 12b, 12C. For the filter option, buttons are added to the Filter Bar: a Drill Down Button and a Drill Up Button. When the filter option is employed, all of the Nodes in the diagram are checked, in accordance with a Drill Customizing Table, to determine if the Nodes are a parent to another Node. If the Nodes are a parent, during "Drill Down", then each parent in the diagram is expanded into its respective children Nodes. In some embodiments, the data in the User Interface is subjected to a drill down/up according to a Node click option. An example of the Node click option is included in FIG. 12E, 12F, 12G. When the Node click option is employed, only the selected Nodes in the diagram are checked, in accordance with a Drill Customizing Table, to determine if the Nodes are a parent to another Node. If the selected Nodes are a parent, during "Drill Down", then each selected Node having a parent in the diagram is expanded into its respective children Nodes. According to some configurations of the User Interface, both the filter option and the Node click option can be used on the displayed Customer Journeys. In other example embodiments, only one of the described methods is eligible for implementation on the displayed Customer Journeys at any point in time.

FIG. 12A is an illustration of a Drill Customizing Table 1200 that is configured to supply upon a user demand the hierarchical relationship between Nodes in a Customer Journey diagram. In the example provided in FIG. 12A, a Drill Customizing Table is provided to dictate the relative hierarchical relationship between the data available for expansion in a Drill Down operation or contraction in a Drill Up operation. The Drill Customizing Table includes a number of entries: 1202, 1204, 1206, 1208, 1210, 1212, 1214, and 1216. The headings for the Drill Customizing Table include, at least, "Node ID" 1218, "Parent Node ID" 1220, and optionally, "Color" 1222. In entry 1202 to 1210 the top level hierarchical Nodes are displayed. The top level hierarchical Nodes include: Email, Internet, Store, Phone, and Buy. In some example embodiments, each of the top hierarchical Nodes is assigned a different color in the Color heading 1222. Entries 1214 to 1216 represent the lower level hierarchical Nodes. In their respective Parent Node ID column, they each identify "Email" (from entry 1202), as their parent. Accordingly, the lower level hierarchical Nodes: Hotmail, Gmail, and Outlook mail, each are related to Email. In an example embodiment, the lower level hierarchical Nodes are assigned the same color as their respective parent. As such, Hotmail, Gmail, and Outlook mail are assigned the color Green. In some example embodiments, the lower level hierarchical Nodes are assigned a different color than their respective parent.

Figure 12B:
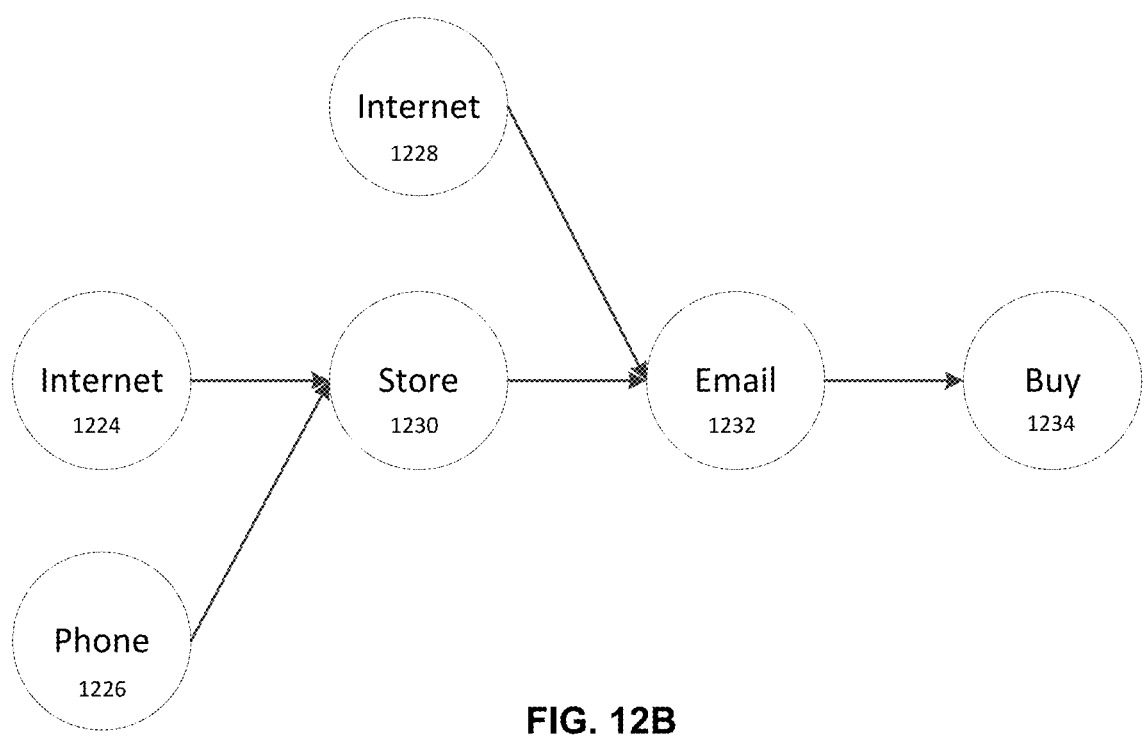
FIG. 12B is an illustration of a Customer Journey diagram displaying an example set of paths as eligible for drilling in accordance with the associated Drill Customizing Table.

FIG. 12B is an illustration of a Customer Journey diagram displaying an example set of paths as eligible for drilling in accordance with the associated Drill Customizing Table. having Nodes presented according to a highest level hierarchical version of the Drill Customizing table and that is eligible for complete diagram drilling. FIG. 12B provides a flowchart demonstrating three different Customer Journey paths that pass through an "EMAIL" Node 1232. As described above, a first Customer Journey in the diagram includes: INTERNET 1228, EMAIL 1232, and BUY 1234. A second Customer Journey in the diagram includes: INTERNET 1224, STORE 1230, EMAIL 1232, and BUY 1234. A third Customer Journey in the diagram includes: PHONE 1226, STORE 1230, EMAIL 1232, and BUY 1234. FIG. 12B provides a highest level diagram, according to the Drill Customizing Table from FIG. 12A, in which only the parent Nodes are displayed.

Figure 12C:
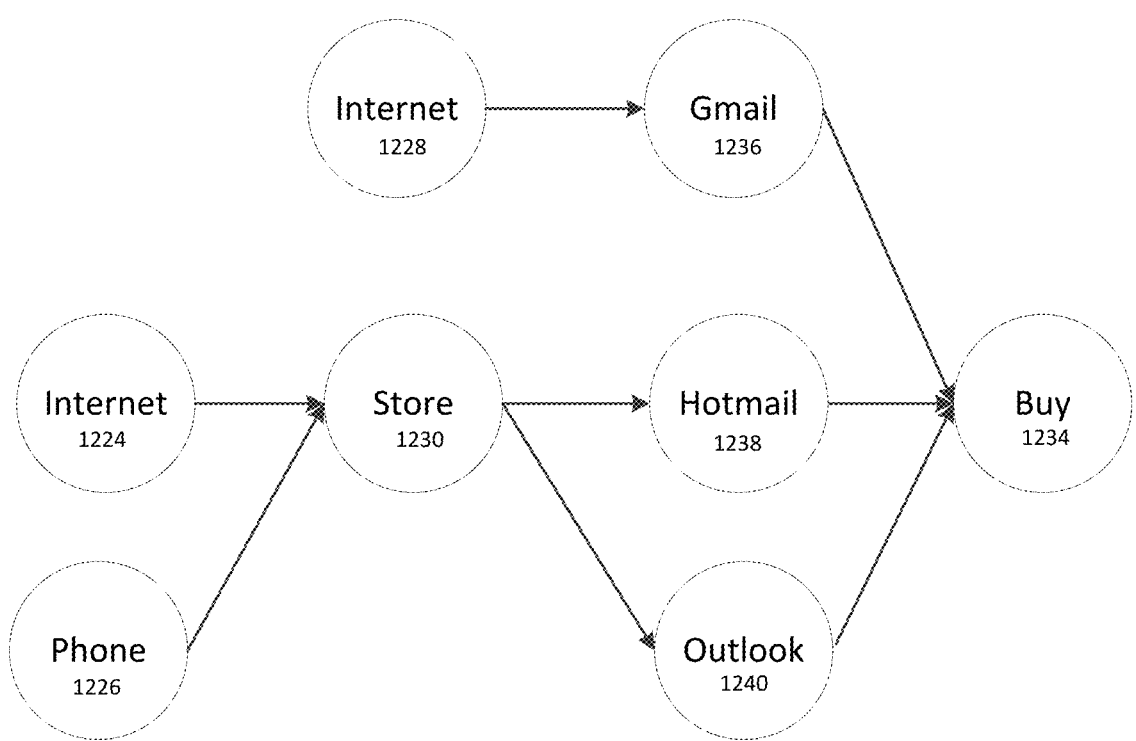
FIG. 12C is an illustration of another example embodiment of a Customer Journey diagram displaying an example set of paths as eligible for drilling in accordance with the associated Drill Customizing Table.

FIG. 12C is an illustration of another example embodiment of a Customer Journey diagram displaying an example set of paths as eligible for drilling in accordance with the associated Drill Customizing Table. FIG. 12C is an illustration of a Customer Journey diagram having Nodes presented after a complete diagram drill according to the Drill Customizing table. Following a user selection of a DRILL DOWN icon, FIG. 12B is transformed into FIG. 12C. FIG. 12C includes, wherever possible, a descent into a lower level of Nodes. Specifically, in FIG. 12C and according to the Drill Customizing Table, only the "EMAIL" Node is eligible for drill down and therefore the EMAIL Node is no longer displayed. Instead of the "EMAIL" Node, corresponding replacements for the three paths are provided as GMAIL 1236, HOTMAIL 1238, and OUTLOOK 1240. In accordance with the Drill Customization Table of FIG. 12A, the system read the data from the customization table to find the direct children of the Nodes and determined whether paths in the Customer Journey diagram existed for the children nosed. The Nodes that had no children (i.e., INTERNET, STORE, PHONE, and BUY) were maintained and unchanged. In another example embodiment, a selection of a DRILL UP icon on the diagram while FIG. 12C is displayed results in the display shown in FIG. 12B.

FIG. 12D is an illustration of a Drill Customizing table that provides a hierarchical relationship between Nodes in a Customer Journey diagram. In the example provided in FIG. 12D, a Drill Customizing Table is provided to dictate the relative hierarchical relationship between the data available for expansion in a Drill Down operation or contraction in a Drill Up operation. The Drill Customizing Table includes a number of entries: 1202, 1204, 1206, 1208, 1210, 1212, 1214, 1216, 1242, 1244, and 1246. The headings for the Drill Customizing Table include, at least, "Node ID" 1218, "Parent Node ID" 1220, and optionally, "Color" 1222. In entry 1202 to 1210 the top level hierarchical Nodes are displayed. The top level hierarchical Nodes include: Email, Internet, Store, Phone, and Buy. In some example embodiments, each of the top hierarchical Nodes is assigned a different color in the Color heading 1222. Entries 1214 to 1216 and 1242 to 1246 represent the lower level hierarchical Nodes. In their respective Parent Node ID column, entries 1214 to 1216 each identify "Email" (from entry 1202), as their parent. Accordingly, the lower level hierarchical Nodes: Hotmail, Gmail, and Outlook mail, each are related to Email. In their respective Parent Node ID column, entries 1242 to 1246 each identify "Store" (from entry 1206), as their parent. According, the lower level hierarchical Nodes: Best Buy and Circuit City, each are related to Store. In an example embodiment, the lower level hierarchical Nodes are assigned the same color as their respective parent. As such, Hotmail, Gmail, and Outlook mail are assigned the color Green. Best Buy and Circuit City are assigned the color Purple. In some example embodiments, the lower level hierarchical Nodes are assigned a different color than their respective parent. In some example embodiments, all of the lower level hierarchical Nodes are assigned a same color.

Figure 12E:
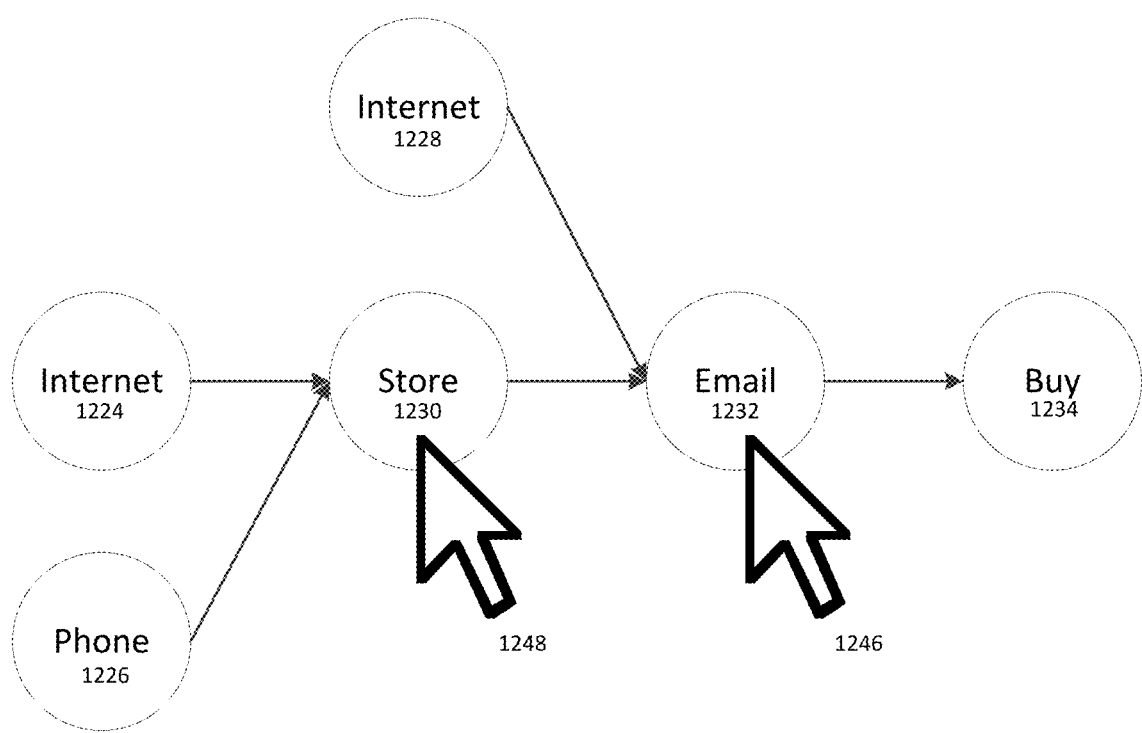
FIG. 12E is an illustration of another example embodiment of a Customer Journey diagram displaying an example set of paths as eligible for drilling in accordance with the associated Drill Customizing Table.

FIG. 12E is an illustration of a Customer Journey diagram having Nodes presented according to a highest level hierarchical version of the Drill Customizing table and that is eligible for on-click drilling. FIG. 12E provides a flowchart demonstrating three different Customer Journey paths, two of which pass through a "STORE" Node 1230 and three of which pass through an "EMAIL" Node 1232. As described above, a first Customer Journey in the diagram includes: INTERNET 1228, EMAIL 1232, and BUY 1234. A second Customer Journey in the diagram includes: INTERNET 1224, STORE 1230, EMAIL 1232, and BUY 1234. A third Customer Journey in the diagram includes: PHONE 1226, STORE 1230, EMAIL 1232, and BUY 1234. FIG. 12B provides a higher level diagram according to the Drill Customizing Table, in which only the parent Nodes are displayed. In FIG. 12E, the diagram is eligible for on-click drilling. Accordingly, a user can click on the Nodes to expand, or contract, that particular Node in accordance with the Drill Customizing Table. As shown in FIG. 12D, both the Nodes Store 1230 and Email 1232 are eligible for expansion. Therefore, a user can drill down by clicking 1248 on Store 1230 or by clicking 1246 on Email 1232.

Figure 12F:
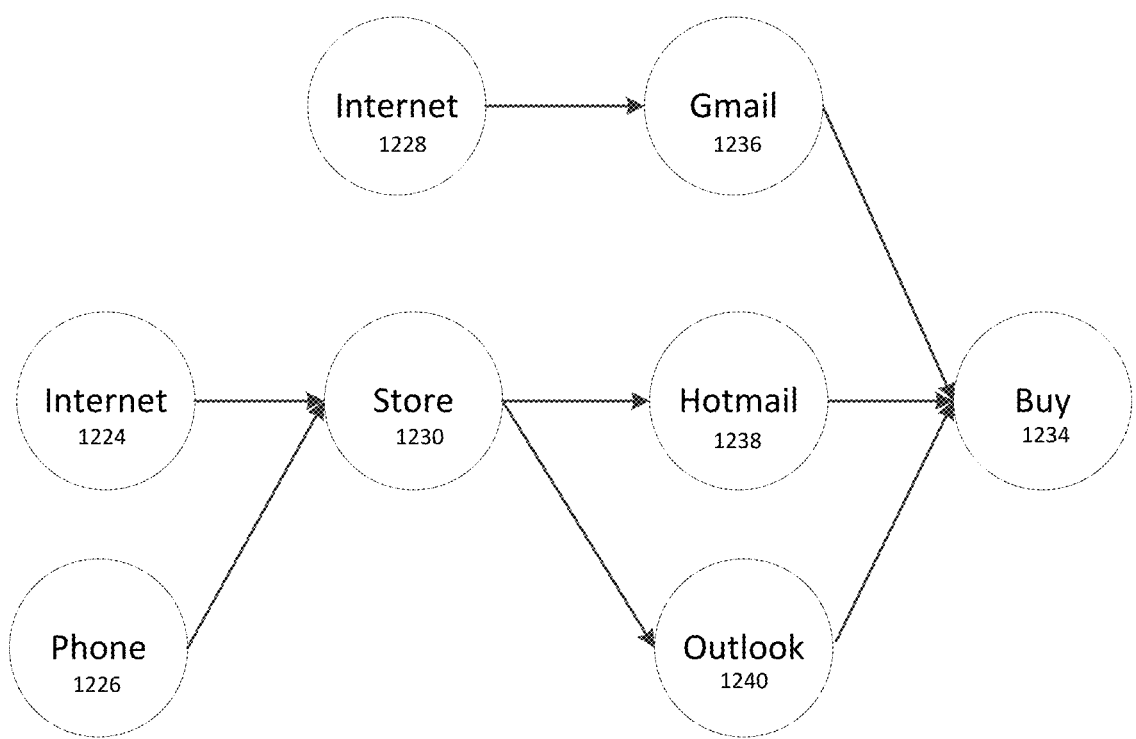
FIG. 12F is an illustration of another example embodiment of a Customer Journey diagram displaying an example set of paths as eligible for drilling in accordance with the associated Drill Customizing Table.

FIG. 12F is an illustration of a Customer Journey diagram having Nodes presented after an on-click drill according to the Drill Customizing Table. After the user has selected "Email 1232" with a click 1246, the Customer Journey diagram expands to the diagram shown in FIG. 12F. When the EMAIL Node is clicked on, only the EMAIL Node is expanded into its respective children Nodes, herein presented as GMAIL 1236, HOTMAIL 1238, and OUTLOOK 1240. As only the clicked upon Node is expanded into its children, any other Nodes having children, such as Store 1230, remain at their current topography. The selection for expansion in drill down or contraction in drill up provides the user with greater command over the data displayed and can selectively provide the user with more detail.

Figure 12G:
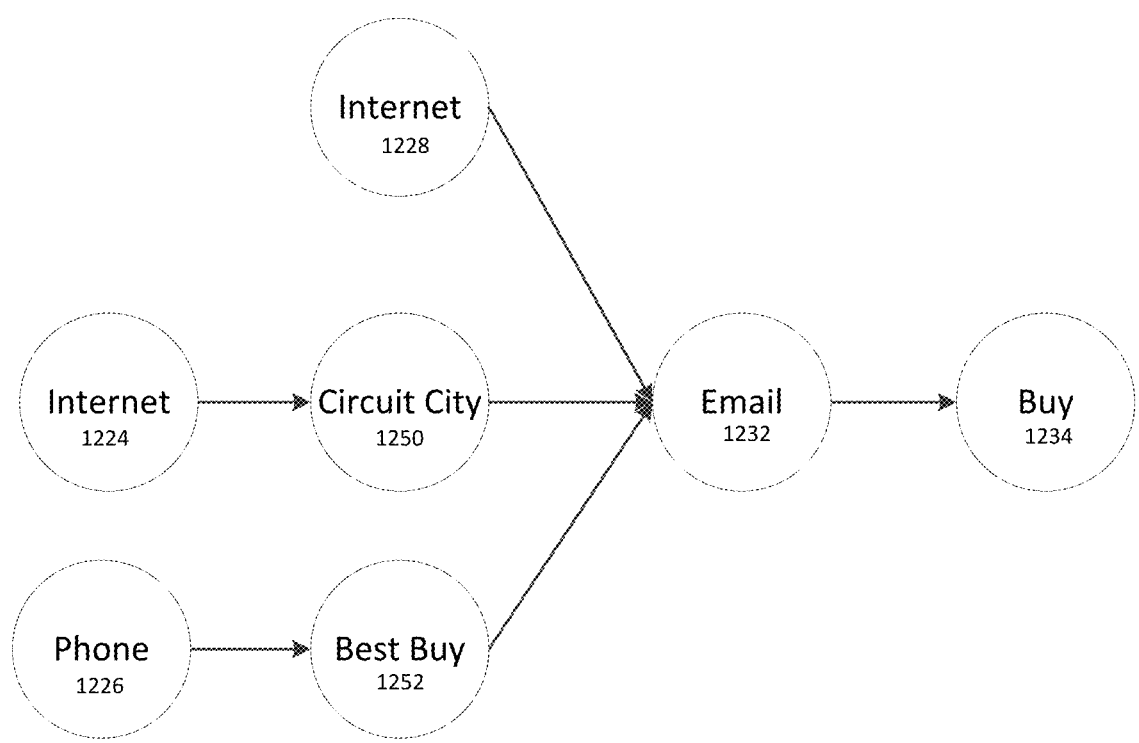
FIG. 12G is an illustration of another example embodiment of a Customer Journey diagram displaying an example set of paths as eligible for drilling in accordance with the associated Drill Customizing Table.

FIG. 12G is an illustration of a Customer Journey diagram having Nodes presented after an on-click drill according to the Drill Customizing Table. After the user has selected "Store 1230" with a click 1248, the Customer Journey diagram expands to the diagram shown in FIG. 12G. When the STORE Node is clicked on, only the STORE Node is expanded into its respective children Nodes, herein presented as CIRCUIT CITY 1250 and BEST BUY 1252. As only the clicked upon Node is expanded into its children, any other Nodes having children, such as Store 1230, remain at their current topography. The selection for expansion in drill down or contraction in drill up provides the user with greater command over the data displayed and can selectively provide the user with more detail.

Method to Dynamically Bring in Focus on Data Content Based on Customer Journey Element Selection As described in the foregoing, the User Interface provides a plurality of paths, with each path representing a user's trajectory through various interactions. In order to provide a straightforward user experience, according to an example embodiment, a user can select additional ways in which to alter the display of the useful insights from the Customer Journeys to the user. In particular, when a flow of data includes voluminous data, categorized by large numbers of Nodes and lines an additional display visualization method is useful to employ. To address these circumstances, the system allows for the User Interface to expand to view a larger set of data and to contract to view a smaller set of data. In part, the visualization technique involves the user selecting whether, and to what extent, the user would like to view an entire set of data or a subset of data. To focus the view of the User Interface according to the user's preferences, the user can expand the User Interface using a "Zoom Out" tool. Similarly, to focus the view of the User Interface according to the User's preferences, the user can contract the User Interface using a "Zoom In" tool. In other example embodiments, a user interface is available on a touchscreen device and a click can instead be generated by a similar interactive technique on the touchscreen.

If the program is sponsored on a browser based application, common user interactions are translated to perform a "Zoom Out" or "Zoom In" functionality. For example, a Zoom Out can be performed according to: a selection of a Zoom Out button, a selection of a point with a mouse while holding the CONTROL button and scrolling by the user, and a pinch user gesture on a touchscreen. Similarly a Zoom In can be performed according to: a selection of a Zoom In button, a selection of a point with a mouse while holding the CONTROL button and scrolling by the user, and a user spread gesture on a touchscreen. By performing a Zoom In on a region of the diagram, the content in the region becomes more visible and in some embodiments is automatically emphasized by the program. By performing a Zoom Out on a region of the diagram, the content in the region becomes less visible and in some embodiments is automatically deemphasized by the program.

Figure 13A:
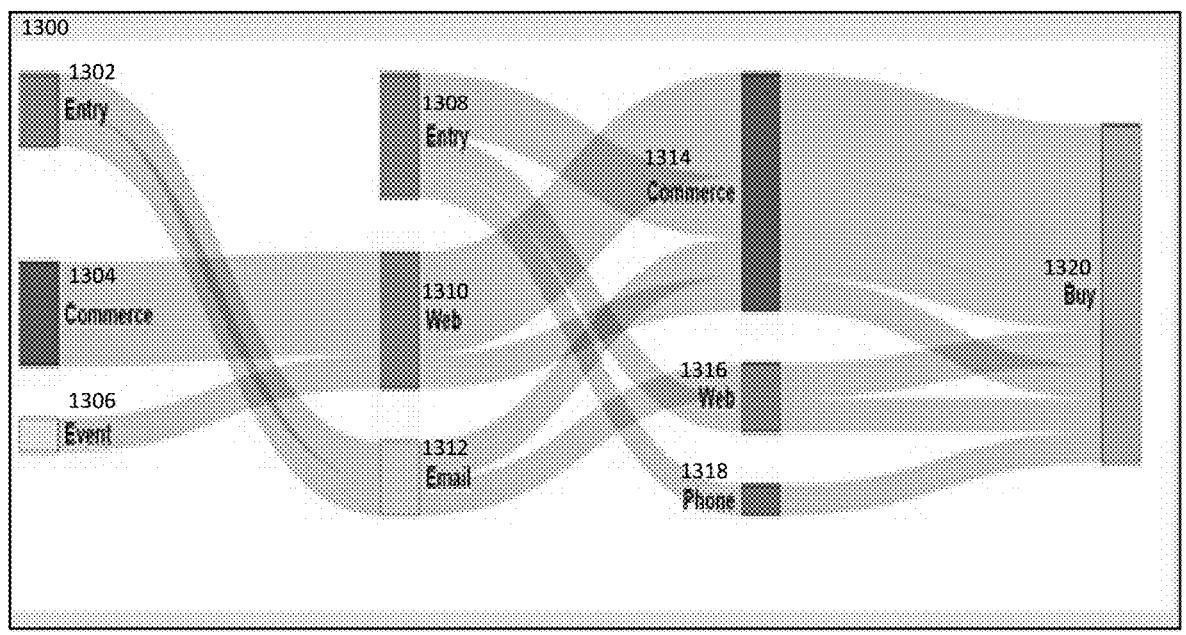
FIG. 13A is an illustration of a Customer Journey diagram 1300 configured to provide dynamic focus on data content from a user selection that includes a totality of data available for a filter set.

FIG. 13A is an illustration of a Customer Journey diagram 1300 configured to provide dynamic focus on data content from a user selection that includes a totality of data available for a filter set. For example, the diagram includes 10 different Nodes: Entry Level One 1302, Commerce Level One 1304, Event 1306, Entry Level Two 1308, Web Level Two 1310, Email 1312, Commerce Level Three 1314, Web Level Three 1316, Phone 1318, and Buy 1320. However, the number of paths included in the diagram could, in an example embodiment, be too numerous for the purposes of a user. Similarly, a user could have greater concern with a subset of the diagram than the diagram in its entirety.

Accordingly, the User desires to perform a Zoom In on a region of interest in the diagram.

Figure 13B:
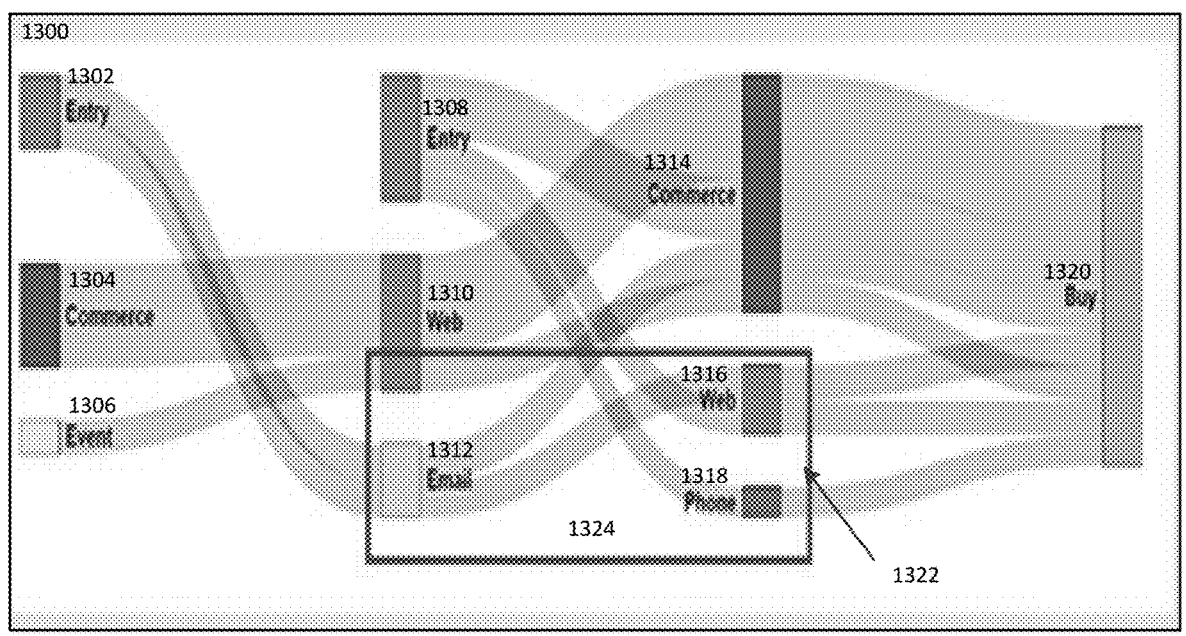
FIG. 13B is an illustration of another example embodiment of a Customer Journey diagram 1300 configured to provide dynamic focus on data content from a user selection that includes a totality of data available for a filter set.

FIG. 13B is an illustration of another example embodiment of a Customer Journey diagram 1300 configured to provide dynamic focus on data content from a user selection that includes a totality of data available for a filter set. FIG. 13B further specifies a Zoom In area of interest. The diagram 1300 presents the above-described 10 different Nodes. However, in FIG. 13B, the user has specified with Box 1322 a region of interest 1324. The region of interest includes only the Nodes associated with Email 1312, Web Level Three 1316, and Phone 1318. In the displayed example embodiment, the Box 1322 specifies the region 1324, and the user can thereafter perform a zoom into the region by selecting a Zoom In button. In some embodiments, other user selections and/or gestures on the User Interface and or a device linked to the User Interface can result in a zoom in. In an example embodiment, a pin action on a smart device results in a zoom in. In another example embodiment, a mouse drag feature, which highlights a region, results in a zoom in that focuses on the region of 1324.

Figure 13C:
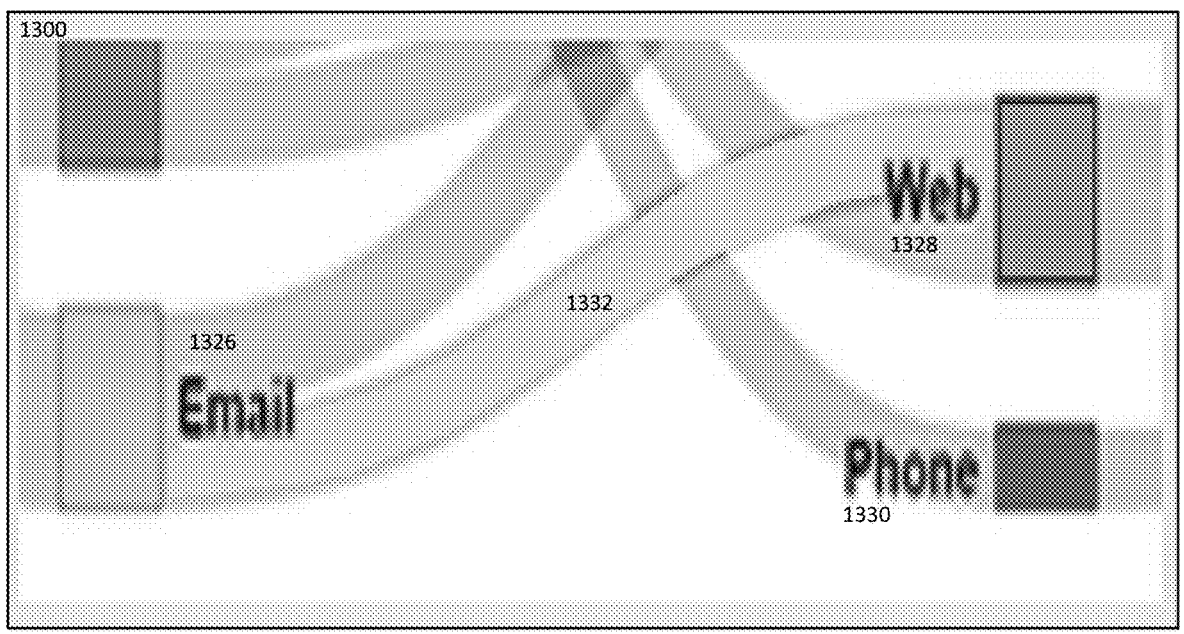
FIG. 13C is an illustration of another example embodiment of a Customer Journey diagram 1300 configured to provide dynamic focus on data content from a user selection that includes a totality of data available for a filter set.

FIG. 13C is an illustration of another example embodiment of a Customer Journey diagram 1300 configured to provide dynamic focus on data content from a user selection that includes a totality of data available for a filter set. FIG. 13C includes the data that was specified by the user as a region of interest. The diagram 1300 shown in FIG. 13C is a result of the Zoom In from FIG. 13B that was associated with the region of interest 1324. The region of interest shown in FIG. 13C still includes the same Nodes, which are each now included in a set of new Nodes that are particular to the region of interest: Email 1326, Web Level Three 1328, and Phone 1330. The data set included in the display is relatively less than the data set that was displayed in FIG. 13B. The visualization available in FIG. 13C is provided with greater detail. Moreover, the visualization emphasizes the regions of the data included in FIG. 13C.

The Nodes that are entirely included in the diagram, and which are included in the set of new Nodes, after the Zoom In are considered to be the totality of the set of new Nodes in the new diagram. Accordingly, the Nodes in the set of new Nodes are emphasized. As shown in FIG. 13C, the Web Node 1310 is not part of the set of new Nodes because it is not included entirely in the frame of the diagram. In an example embodiment, the Nodes in the set of new Nodes are highlighted in different shades of a similar color to make them visually different from the remaining parts of the diagram. In another example embodiment, links that are between Nodes in the set of new Nodes are also emphasized. For example, link 1332 is between the Nodes for Email 1326 and Web Level Three 1328. Accordingly link 1332 is further emphasized. In an example embodiment, the link 1332 is highlighted in a shade of color that distinguishes it from the remaining parts of the diagram and that is different from the color selected for the Nodes in the set of new Nodes.

In an example embodiment, when the FIG. 13C is generated, the associated analysis provided to the user in at least one of the Contextual Data and Actions is altered. Specifically, the available data set changes. For example, in FIG. 13A, three Level One Nodes were included: Entry Level One 1302, Commerce Level One 1304, and Event 1306. However, in FIG. 13C, the only Level One Node available for analysis is Email 1326. Similarly, in FIG. 13A, the last Node, which was a Level Four Node, was Buy 1320. In FIG. 13C, the last Nodes available include: Web Level Three 1316 and Phone 1318. After a Zoom Operation has occurred, the program analyzes all of the start and end Nodes available in the set of new Nodes. All of the related links, possible entirely between the start Nodes in the set of new Nodes and the end Nodes in the set of new Nodes, are calculated. To do so, the program iterates all possible combinations that could occur between the start Nodes and the end Nodes in the set of new Nodes. If the Node combination, from the total data set, is identified in the iteration sequence by the program, then the algorithm processes that identifies Node combination as a path to be included in data and action analysis.

It should be appreciated that the present invention can be implemented in numerous ways, including as a process, an apparatus, a system, a computer processor executing software instructions, or a computer readable medium such as a non-transitory computer readable storage medium, or a computer Network wherein program instructions are sent over optical or electronic communication or non-transitory links. It should be noted that the order of the steps of disclosed processes can be altered within the scope of the invention, as noted in the appended claims and in the description herein.

Although the foregoing invention has been described in some detail for purposes of clarity of understanding, it will be apparent that certain changes and modifications can be practiced within the scope of the appended claims. The present invention can be practiced according to the claims and/or the embodiments without some or all of these specific details. Portions of the embodiments described herein can be used with or without each other and can be practiced in conjunction with a subset of all of the described embodiments. For the purpose of clarity, technical material that is known in the technical fields related to the invention has not been described in detail so that the present invention is not unnecessarily obscured.

It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A system for analyzing at least one user selection of a journey in a Sankey diagram of at least one customer, the system comprising:
   a server configured to:
      host data related to habits of a plurality of customers and related to at least one relationship between the habits of the plurality of customers,
      process a query by retrieving a subset of the hosted data related to the query and returning the retrieved subset of the hosted data as a response; and
   a user device including:
      a processor configured to:
         recognize the at least one user selection of the journey in the Sankey diagram,
         collect data related to the recognized at least one user selection,
         form the query, according to the collected data, for data from the hosted data related to at least one user selection and query the server, and
         render information as a visual representation of the response from the server, and
      a display device configured to:
         receive the at least one user selection of the journey in the Sankey diagram, one of receive or infer a user desired display type, and display the visual representation according to the one of the received or inferred user desired display type,
wherein the journey includes at least one link that forms a path between at least two nodes;
wherein the visual representation is generated using a dynamic build table, the dynamic build table comprising a plurality of entries that each specify a dynamic rendering, wherein each entry consists of: (a) a context field specifying a context for the entry, (b) a point of click field specifying a particular node or a path in the visual representation, (c) a point of click type field required to initiate the dynamic rendering, the point of click type being either a single click or a double click, and (d) a query field encapsulating a query to effect the dynamic rendering.

2. The system as recited in claim 1, wherein the at least one user selection includes one of: a click on a link in the journey, a click on a path in the journey, and a click on a node in the journey.

3. The system as recited in claim 2, wherein the information provided by the processor in the visual representation includes one of an emphasis on a portion of the journey included in the at least one user selection or a de-emphasis on a remainder of the journey not included in the at least one user selection.

4. The system as recited in claim 2, wherein the at least one user selection of a link is automatically extended to include a path associated with the link as part of the at least one user selection.

5. The system as recited in claim 1, wherein the query targets at least one of contextual data regarding the at least one user selection and an analysis of the habits of customers associated with the at least one user selection according to the one of the received or inferred user desired display type.

6. The system as recited in claim 5, wherein the contextual data includes information regarding at least one of: age, sentiments, gender, marital status, purchase history, and interests.

7. The system as recited in claim 5, wherein the analysis of the habits of customers includes at least one of: creating a segmentation model, creating a target group, and showing a KPI.

8. The system as recited in claim 5, wherein the display device is further configured to request a designation as to whether the contextual data and the analysis of the habits of customers is to be included in a dialog box or a panel in the visual representation, and wherein the processor is further configured to render information according to the designation.

9. The system as recited in claim 1, wherein the processor is further configured to respond to a drilling demand by altering the rendered information, to be provided by the display device as the visual representation, to include one of a parent node or a child node in accordance with a known hierarchical relationship between a currently displayed node and at least one of: the parent node and the child node.

10. A computer-implemented method for analyzing at least one user selection of a journey of at least one customer in a Sankey diagram, the method comprising:
recognizing the at least one user selection of the journey in the Sankey diagram;
collecting data related to the recognized at least one user selection;
forming a query, according to the collected data, for data from a server related to the recognized at least one user selection;
firing the formed query to the server; and rendering information as a visual representation of a response from the server,
wherein the journey includes at least one link that forms a path between at least two nodes, and
wherein the response from the server is based on a retrieval of a subset of data from data that is hosted on the server, wherein the data hosted on the server relates to habits of a plurality of customers and at least one relationship between the habits of the plurality of customers;
wherein the visual representation is generated using a dynamic build table, the dynamic build table comprising a plurality of entries that each specify a dynamic rendering, wherein each entry consists of: (a) a context field specifying a context for the entry, (b) a point of click field specifying a particular node or a path in the visual representation, (c) a point of click type field required to initiate the dynamic rendering, the point of click type being either a single click or a double click, and (d) a query field encapsulating a query to effect the dynamic rendering.

11. The method as recited in claim 10, wherein the at least one user selection includes one of: a click on a link in the journey, a click on a path in the journey, and a click on a node in the journey.

12. The method as recited in claim 11, wherein the information provided that is rendered in the visual representation includes one of an emphasis on a portion of the journey included in the at least one user selection or a de-emphasis on a remainder of the journey not included in the at least one user selection.

13. The method as recited in claim 12, wherein the at least one user selection of a link is automatically extended to include a path associated with the link as part of the at least one user selection.

14. The method as recited in claim 11, the collecting data further comprising:
determining from an additional user input whether the query should address:
contextual data regarding the at least one user selection or an analysis of the habits of customers associated with the at least one user selection.

15. The method as recited in claim 14, wherein the contextual data includes information regarding at least one of: age, sentiments, gender, marital status, purchase history, and interests.

16. The method as recited in claim 14, wherein the analysis of the habits of customers includes at least one of: creating a segmentation model, creating a target group, and showing a KPI.

17. The method as recited in claim 14, further comprising:
receiving a user designation as to whether the contextual data and the analysis of the habits of customers is to be included in a dialog box or a panel in the visual representation; and
generating a customization table system based on the received user designation.

18. The method as recited in claim 10, further comprising:
receiving a demand to drill into the provided visual representation; and
in response to the received demand, altering the visual representation to include one of a parent node or a child node in accordance with a known hierarchical relationship between a currently displayed node and at least one of: the parent node and the child node.

19. A non-transitory computer readable storage device storing program instructions that, when executed, cause a processing device to perform a method for analyzing at least one user selection of a journey of at least one customer in a Sankey diagram, the method comprising:

recognizing the at least one user selection of the journey in the Sankey diagram;

collecting data related to the recognized at least one user selection;

forming a query, according to the collected data, for data from a server related to the recognized at least one user selection;

firing the formed query to the server; and rendering information as a visual representation of a response from the server, wherein the journey includes at least one link that forms a path between at least two nodes, and wherein the response from the server is based on a retrieval of a subset of data from data that is hosted on the server, wherein the data hosted on the server relates to habits of a plurality of customers and at least one relationship between the habits of the plurality of customers;

wherein the visual representation is generated using a dynamic build table, the dynamic build table comprising a plurality of entries that each specify a dynamic rendering, wherein each entry consists of: (a) a context field specifying a context for the entry, (b) a point of click field specifying a particular node or a path in the visual representation, (c) a point of click type field required to initiate the dynamic rendering, the point of click type being either a single click or a double click, and (d) a query field encapsulating a query to effect the dynamic rendering.

\* \* \* \* \*